United States Patent
Bucsa et al.

(10) Patent No.: US 10,592,306 B2
(45) Date of Patent: Mar. 17, 2020

(54) METHOD AND APPARATUS FOR RESOURCE BALANCING IN AN AUTOMATION AND ALARM ARCHITECTURE

(71) Applicant: TYCO SAFETY PRODUCTS CANADA LTD., Concord (CA)

(72) Inventors: Andrei Bucsa, Toronto (CA); Greg Hill, Newmarket (CA)

(73) Assignee: TYCO SAFETY PRODUCTS CANADA LTD., Ontario (CA)

( * ) Notice: Subject to any disclaimer, the term of this patent is extended or adjusted under 35 U.S.C. 154(b) by 31 days.

(21) Appl. No.: 14/857,900

(22) Filed: Sep. 18, 2015

(65) Prior Publication Data

US 2016/0098305 A1    Apr. 7, 2016

Related U.S. Application Data

(60) Provisional application No. 62/059,410, filed on Oct. 3, 2014.

(51) Int. Cl.
 *G06F 9/54* (2006.01)
 *H04L 29/08* (2006.01)
 (Continued)

(52) U.S. Cl.
 CPC ............ *G06F 9/542* (2013.01); *G06F 9/5011* (2013.01); *H04L 65/1036* (2013.01);
 (Continued)

(58) Field of Classification Search
 CPC .... G06F 9/542; G06F 9/5011; H04L 65/1036; H04L 67/12; H04L 67/20; H04L 67/125
 See application file for complete search history.

(56) References Cited

U.S. PATENT DOCUMENTS

| 5,475,364 A | 12/1995 | Kenet |
| 5,568,535 A | 10/1996 | Sheffer et al. |

(Continued)

FOREIGN PATENT DOCUMENTS

CA    2885731 A1    3/2014

OTHER PUBLICATIONS

ISR and Written Opinion dated Mar. 28, 2017, in corresponding International Patent Application No. PCT/CA2017/050008.

(Continued)

*Primary Examiner* — Brian W Wathen
*Assistant Examiner* — Carina Yun
(74) *Attorney, Agent, or Firm* — Arent Fox LLP

(57) ABSTRACT

A method and system architecture for automation and alarm systems is provided. According to exemplary embodiments, relatively simple processing tasks are performed at the sensor level, with more complex processing being shifted to the gateway entity or a networked processing device. The gateway entity dynamically allocates processing resources for sensors. If a sensor detects than an event is occurring, or predicts that an event is about to occur, the sensor submits a resources allocation request and a power balancer running on the gateway entity processes the request. In response to the resources allocation request, the gateway entity allocates some processing resources to the requesting sensor and the data is processed in real-time or near-real-time by the gateway entity.

20 Claims, 13 Drawing Sheets

(51) Int. Cl.
*G06F 9/50* (2006.01)
*H04L 29/06* (2006.01)

(52) U.S. Cl.
CPC ............ *H04L 67/12* (2013.01); *H04L 67/125* (2013.01); *H04L 67/20* (2013.01)

(56) References Cited

U.S. PATENT DOCUMENTS

| | | | |
|---|---|---|---|
| 5,864,286 A | 1/1999 | Right et al. | |
| 6,317,042 B1 | 11/2001 | Engelhorn et al. | |
| 7,971,143 B2 | 6/2011 | Santanche et al. | |
| 8,248,226 B2 | 8/2012 | Friar | |
| 8,498,864 B1* | 7/2013 | Liang | G10L 15/22 369/25.01 |
| 8,710,983 B2 | 4/2014 | Malkowski | |
| 9,064,389 B1* | 6/2015 | Bernstein | G08C 17/02 |
| 9,372,213 B2 | 6/2016 | Auguste et al. | |
| 2001/0056350 A1* | 12/2001 | Calderone | G06Q 20/102 704/270 |
| 2003/0062997 A1 | 4/2003 | Naidoo et al. | |
| 2005/0179539 A1* | 8/2005 | Hill | G08B 13/19632 340/539.1 |
| 2006/0143350 A1* | 6/2006 | Miloushev | G06F 9/5016 710/242 |
| 2007/0073861 A1* | 3/2007 | Amanuddin | H04L 43/0817 709/224 |
| 2007/0146127 A1 | 6/2007 | Stilp et al. | |
| 2007/0249319 A1* | 10/2007 | Faulkner | H04L 1/22 455/402 |
| 2007/0283001 A1* | 12/2007 | Spiess | H04L 12/2602 709/224 |
| 2008/0048861 A1 | 2/2008 | Naidoo et al. | |
| 2008/0177683 A1 | 7/2008 | No et al. | |
| 2009/0120653 A1 | 5/2009 | Thomas | |
| 2009/0195382 A1* | 8/2009 | Hall | G08B 13/19613 340/541 |
| 2009/0273462 A1* | 11/2009 | Addy | G08B 25/14 340/506 |
| 2010/0031324 A1* | 2/2010 | Strich | G06F 21/10 726/4 |
| 2010/0083356 A1* | 4/2010 | Steckley | H04L 12/2818 726/5 |
| 2011/0034176 A1 | 2/2011 | Lord et al. | |
| 2011/0317007 A1 | 12/2011 | Kim | |
| 2012/0032527 A1 | 2/2012 | Weidner et al. | |
| 2012/0154126 A1 | 6/2012 | Cohn et al. | |
| 2012/0229283 A1 | 9/2012 | McKenna | |
| 2013/0150686 A1 | 6/2013 | Fronterhouse et al. | |
| 2013/0212214 A1 | 8/2013 | Lawson et al. | |
| 2013/0215850 A1* | 8/2013 | Zakrzewski | H04W 52/0261 370/329 |
| 2013/0314229 A1* | 11/2013 | Tu | G08B 23/00 340/539.22 |
| 2014/0115682 A1 | 4/2014 | He et al. | |
| 2014/0139342 A1 | 5/2014 | Brown | |
| 2014/0225603 A1 | 8/2014 | Auguste et al. | |
| 2014/0266684 A1 | 9/2014 | Poder et al. | |
| 2014/0282486 A1 | 9/2014 | Hisamoto et al. | |
| 2014/0340216 A1 | 11/2014 | Puskarich | |
| 2015/0022344 A1 | 1/2015 | Matsuoka et al. | |
| 2015/0118988 A1 | 4/2015 | Shaw | |
| 2015/0170503 A1 | 6/2015 | Wedig et al. | |
| 2015/0253365 A1 | 9/2015 | Auguste et al. | |
| 2015/0313172 A1 | 11/2015 | Johnston et al. | |
| 2015/0350303 A1 | 12/2015 | Lin | |
| 2016/0111091 A1 | 4/2016 | Bakish | |
| 2016/0255423 A1 | 9/2016 | Suzuki et al. | |

OTHER PUBLICATIONS

Extended European Search Report for European Application No. 15831829, dated Mar. 16, 2018, 1 page.

Spanish Office Action dated Feb. 28, 2019 issued in corresponding Spanish Application No. 201790010.

International Search Report and Written Opinion dated Nov. 3, 2015, as issued in corresponding international patent application No. PCT/CA2015/050761.

International Search Report and Written Opinion dated Dec. 8, 2015, as issued in corresponding international patent application No. PCT/CA2015/051000.

\* cited by examiner

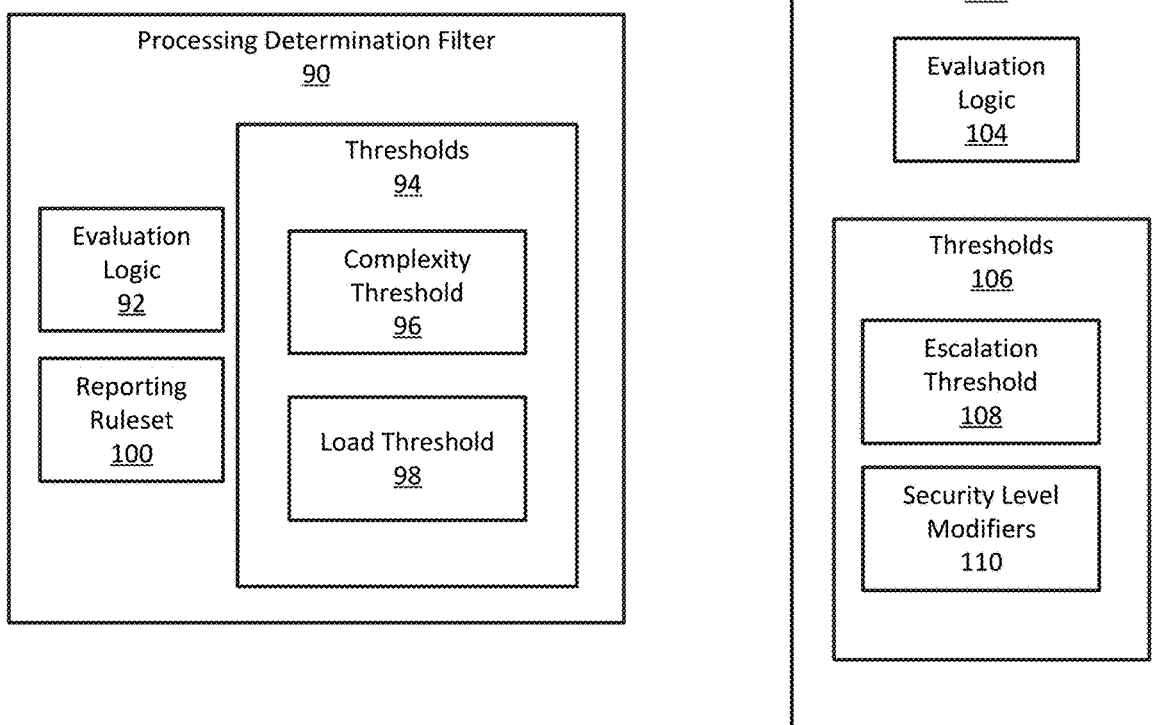
FIG. 8A
FIG. 8B
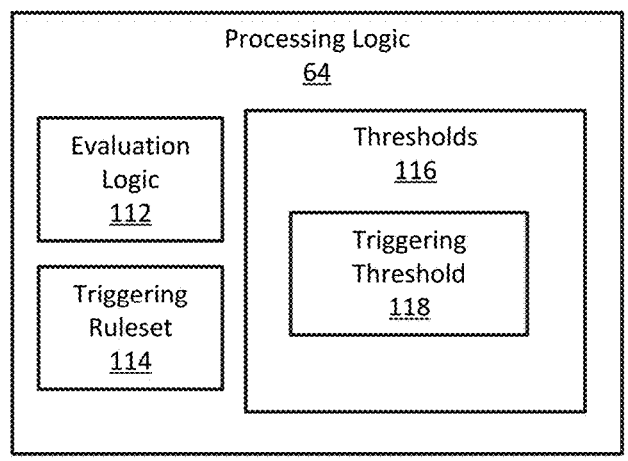
FIG. 9

METHOD AND APPARATUS FOR RESOURCE BALANCING IN AN AUTOMATION AND ALARM ARCHITECTURE

CROSS-REFERENCE TO RELATED APPLICATION

This application claims priority to U.S. Provisional Patent Application No. 62/059,410 filed Oct. 3, 2014, and entitled "Wireless Security and Home Automation". The entirety of this application is incorporated herein by reference.

FIELD OF THE DISCLOSURE

The disclosure relates to the field of automation and alarm systems, and more particularly to methods and apparatuses for balancing resources in a system architecture for an automation or alarm system.

BACKGROUND OF THE DISCLOSURE

Automation and alarm systems (such as home automation systems, fire alarm systems, and security systems) typically include one or more gateway entities (e.g., alarm panels) that receive information from various sensors distributed through a structured area. In response to particular types of input signals, the sensors or the gateway entity sometimes trigger an action by an output device. For example, a typical fire alarm system includes one or more sensors (e.g., smoke detectors or manually-actuated pull stations, etc.) and output devices (e.g., strobes, sirens, public announcement systems, etc.) operably connected to a gateway entity.

In some traditional automation and alarm systems, a sensor includes processing capability for processing the sensor's data. For example, a sensor monitors electrical signals collected by the sensor's detection device for variations that represent the occurrence of an alarm condition. For purposes of logging data and performing data analytics, the sensor forwards information to the gateway entity, and the gateway entity in turn forwards the data to a cloud processing device. The cloud processing device collects data from many sensors and/or gateway entities, analyzes the data, and generates reports.

Processing the data at the sensor requires that the sensor consume power, which can be problematic (especially if the sensor is powered by batteries). Moreover, individual sensors are relatively complex and expensive, because the sensor must be provided with sufficient processing resources so that the sensor can process its own data in isolation. During idle periods, these processing resources go unused and hence are wasted. Still further, if a new update developed for the algorithm that processes the sensor data, each sensor must receive and process the update. This updating process can be complicated and time consuming in an environment with many sensors.

SUMMARY

This disclosure addresses these and other issues with conventional alarm and automation systems. According to exemplary embodiments, relatively simple processing tasks are performed at the sensor level, with more complex processing being shifted to the gateway entity. Other processing tasks requiring greater processing power (e.g., data analytics) are sent to a networked processing device (e.g., a processing device in the cloud), and/or to another third-party device. Thus, a hierarchy of processing capabilities is provided, with the sensors forming a lower level, the gateway entity forming an intermediate level, and the cloud/third party processing devices forming a higher level.

The gateway entity dynamically allocates memory or processing resources for sensors. If a sensor detects than an event is occurring, or predicts that an event is about to occur, the sensor submits a resources allocation request and a power balancer running on the gateway entity processes the request. In response to the resources allocation request, the gateway entity allocates some processing resources to the requesting sensor.

By balancing the processing power between the sensors and the gateway entity, sensors can be made simpler and less expensive, due to the decreased processing power required. Furthermore, improved capabilities can be provided by the system (such as processing voice command data received through the sensors), because the sensors do not need to bear all of the burden or processing complex data. Still further, new features can be deployed, and old features can be updated, by modifying only the processing logic at the gateway entity (instead of the processing logic of each of multiple sensors).

BRIEF DESCRIPTION OF THE DRAWINGS

By way of example, specific exemplary embodiments of the disclosed system and method will now be described, with reference to the accompanying drawings, in which:

FIGS. 6-10B depict exemplary data structures suitable for use in accordance with the present disclosure.

DETAILED DESCRIPTION

This disclosure relates to a system architecture for automation and alarm systems, for which a hierarchy of processing capabilities is defined. Unlike conventional systems in which most of the sensor-data processing is handled by respective sensors, the exemplary system architecture moves processing tasks within the hierarchy in order to conserve resources, perform load balancing, and assign processing tasks to the devices that are best-suited to performing them.

Figure 1:
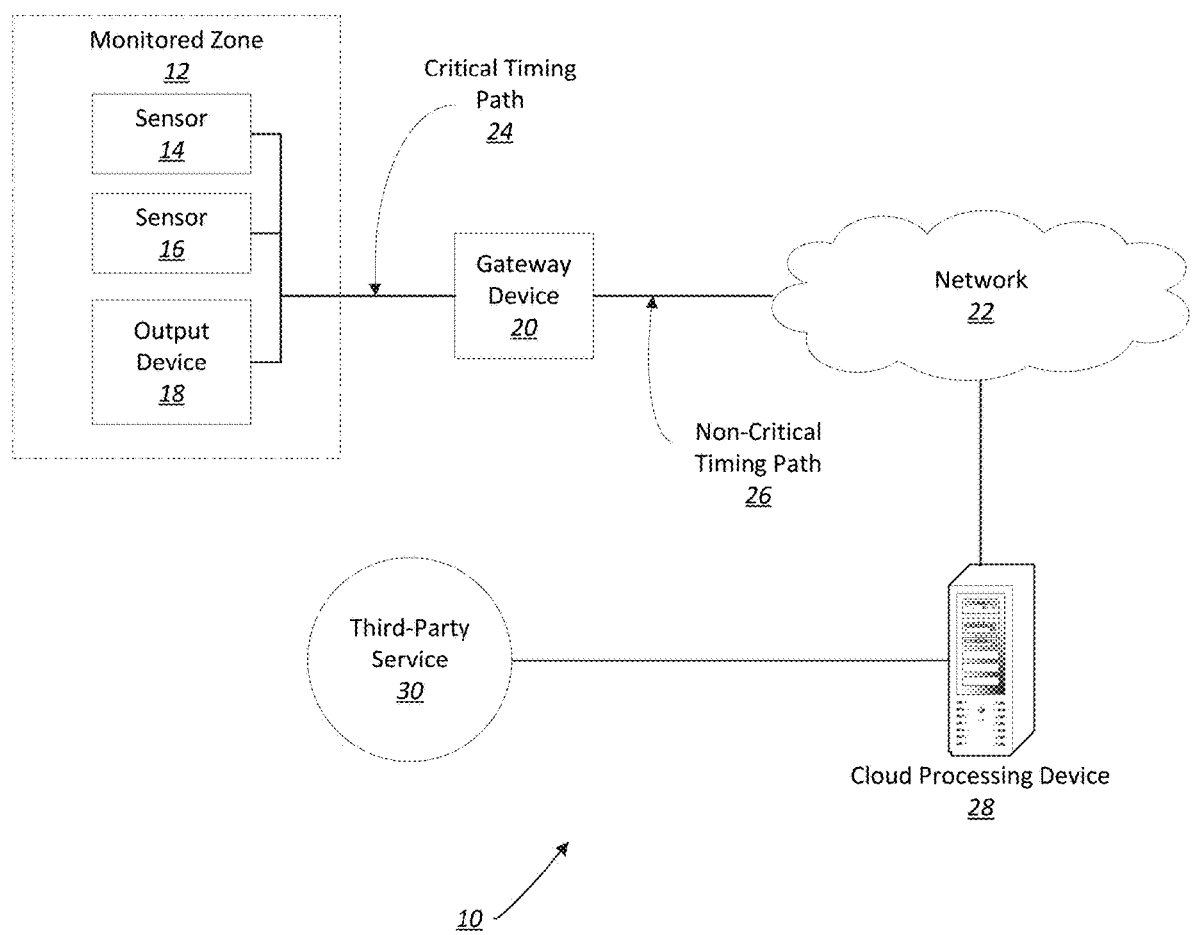
FIG. 1 is a block diagram illustrating an exemplary system architecture in accordance with the present disclosure.

FIG. 1 depicts an example of such a system architecture 10. The system architecture 10 of FIG. 1 is intended to be illustrative only, and one of ordinary skill in the art will recognize that the embodiments described below may be employed in a system architecture having more, fewer, and/or different components than the system architecture 10 of FIG. 1.

The system architecture 10 includes a monitored zone 12. The monitored zone 12 represents a logical grouping of monitored devices, and may or may not correspond to a physical location defined by physical boundaries (e.g., a room or a building). The monitored zone 12 represents, for example, some or all of a residential home, a business, a school, an airport, etc.

The exemplary monitored zone 12 includes a number of sensors (sensor 14 and sensor 16). Sensors include devices that measure or detect a physical property, such as temperature, pressure, the presence of light or smoke, or the position of a switch. A sensor translates the physical property into an electrical signal (e.g., using a transducer). Examples of sensors include environmental sensors (e.g., temperature sensors, pressure sensors, humidity sensors, light level sensors, etc.), status sensors (e.g., door and window switches, smoke detectors, movement detectors, valve status detectors, level indicators, flow level indicators, etc.), health sensors (e.g., heart rate sensors, blood flow sensors, sugar level sensors, body temperature sensors, etc.), location sensors (e.g., Global Positioning System transmitters or other location-based sensors placed on people, animals, property, etc.), as well as general- or multi-purpose sensors (e.g., microphones, cameras, manual pull switches, etc.).

The exemplary monitored zone 12 also includes an output device 18. Output devices include devices that provide an output signal, such as a sound, light, vibration, or an instruction to take an action, in response to a condition. The condition that causes the output device to provide the output signal may be, for example, the detection of a particular output from a sensor (e.g., the signal from the sensor falling below, or rising above, a predefined threshold value, or the detection of a predefined pattern in the sensor data), or a trigger message sent to the output device by another device.

Examples of output devices include notification devices such as speakers, strobe lights, a motor that induces vibration in a mobile device, etc. Some types of notification devices are configured to provide an output perceptible by a human (e.g., a notification device that provides a visual, aural, haptic, or other human-perceptible output), while other types are configured to provide an output perceptible by a machine (e.g., a silent alarm that transmits a notification of a security incident to a server at a security company, or a fire call box that sends an alert to a fire department).

Other examples of output devices include devices that control other devices or objects. Examples of such output devices include devices that open or close a door, turn a light on or off, adjust a heating, ventilating, or air conditioning (HVAC) device, etc.

A gateway entity 20 monitors and controls the sensors 14, 16 and the output device 18 of the monitored zone 12. Gateway entities include devices that manage or oversee the devices of a monitored zone 12, and which optionally communicate with devices outside of the monitored zone 12. The exemplary gateway entity 20 processes input data received from the sensors 14, 16 determines whether the sensor data indicates that an action should be taken, such as raising an alarm, and triggers the output device 18.

Examples of gateway entities 20 include dedicated control panels and local computing devices (such as personal computers or local servers).

The gateway entity 20 can be deployed in the monitored zone 12, located near the monitored zone 12, or located remotely from, while remaining communicatively connected to, the monitored zone 12.

The embodiment of FIG. 1 includes a single monitored zone 12 controlled by a single gateway entity 20. In other embodiments, multiple monitored zones may be controlled by distinct gateway entities, or the monitored zones may be collectively monitored by a single gateway entity.

The sensors 14, 16 and the output device 18 are in communication with and operatively connected to the gateway entity 20. The connection may be a wireless connection (e.g., through Wi-Fi or a low-power short-range radio communication technology) or a hard-wired connection (e.g., through copper or fiber optic communications cabling, or through a power line network).

The gateway entity 20 communicates with remote entities through a network 22. A network 22 is a collection of two or more nodes and links between the nodes that allow communicated information to be passed between the nodes. A network 22 may be wired or wireless. Examples of a network 22 include computer networks (such as the Internet, a local area network, or a metropolitan area network), and telephone networks (such as landline telephone exchanges and wireless telecommunications networks).

A critical timing path 24 exists between the gateway entity on one side, and the sensors 14, 16 and the output device 18 on another side. The critical timing path 24 carries time-sensitive data (e.g., sensor data that may be indicative of the occurrence of an event, such as a fire, break-in, or medical emergency) that is designated for real-time or near-real-time processing as the data is being generated. Because the data from the sensor 14 is time-sensitive and is being processed away from the sensor 14 that generated the data, the communication path(s) for exchanging information between the sensor 14 and the processing device (the gateway entity 20, in this example) must be robust and relatively fast.

In the depicted embodiment, a non-critical timing path 26 exists between the gateway entity 20 and the network 22. In this embodiment, the devices on the other side of the network 22 from the gateway entity (i.e., the cloud processing device 28 and the third-party service 30) perform non-time-sensitive, relatively complex processing tasks. For example, the cloud processing device 28 performs tasks such as data aggregation and logging, report generation, and data analytics. Because these calculations are not time-sensitive and do not need to be performed in real-time as the data is generated, the communication path between the gateway entity 20 and the network 22 is considered a non-critical timing path 26. Nonetheless, in some embodiments, connections between the gateway entity 20 and other devices in the architecture 10 may be designated as critical timing paths, depending on the application.

The devices of the system architecture 10, including the gateway entity 20, the sensors 14 and 16, and the output device 18 includes some amount of processing power. A cloud processing device 28 augments the processing capabilities of the other devices in the architecture 10. A cloud processing device 28 is a device that is accessible to the gateway entity 20 through the network 22 and that provides additional processing capabilities that can be called upon by the gateway entity 20 or another device in the system architecture 10 in order to perform processing tasks.

A third-party service 30 receives information from the gateway entity 20 and/or the cloud processing device 28. A third-party service 30 is an entity that receives information about the status of sensors and/or monitored zones in the architecture 10 and is usually distinct from the entity that owns or controls the devices of the monitored zone 12. The third-party service 30 may be, but is not necessarily, operated by the same entity that operates the cloud processing device 28. The third-party service 30 can take an action in response to the information, such as logging the information for future use, aggregating the information with other information to generate a report, acknowledging emergencies, and dispatching first responders to the monitored zone 12. Examples of third-party services 30 include security companies, fire departments, doctors' offices and hospitals, and data storage centers.

Figure 2:
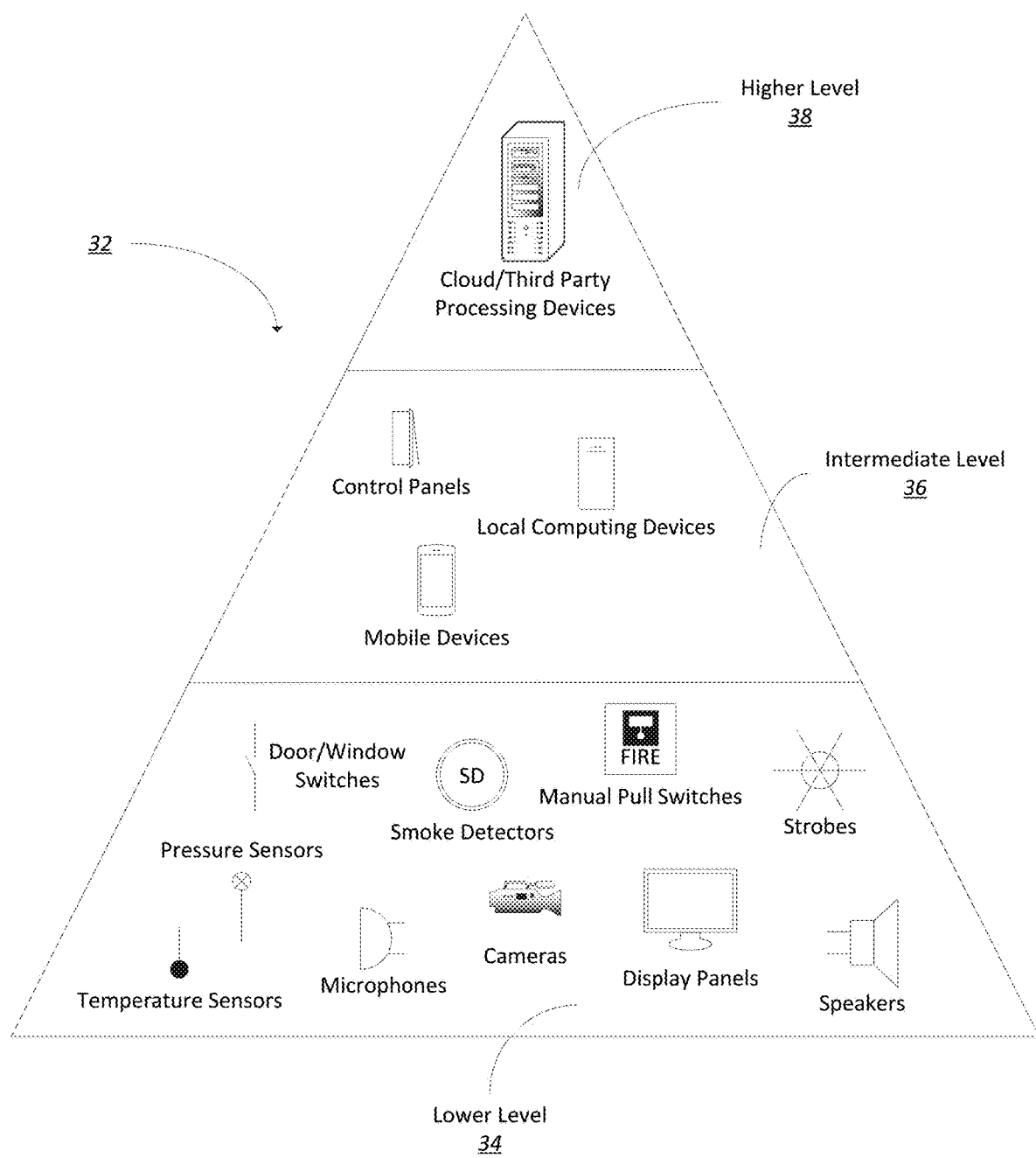
FIG. 2 depicts a hierarchy of processing devices in the system architecture.

According to exemplary embodiments, the devices of the system architecture 10 are organized into a hierarchy for purposes of processing sensor data, updating a system status, and triggering output devices (among other possibilities). FIG. 2 depicts an example of a hierarchy 32 of devices in the system architecture 10.

At a lower level 34 of the hierarchy 32, sensors and output devices are grouped together. Sensors and output devices typically possess limited processing capabilities and limited power, and hence are poorly-suited to complex processing tasks. Nonetheless, such devices can be relied upon to perform relatively simple processing tasks.

Moreover, these devices are typically deployed in a specific context and/or are called upon to monitor a very particular type of input. For example, a glass break sensor is a type of sensor that employs a microphone to record sound (e.g., in the vicinity of a window), which is then analyzed in order to detect a predetermined pattern or signal indicative of the sound of breaking glass. Even if the glass break sensor has only limited processing capabilities, those capabilities can be employed to detect relatively simple glass-break patterns, thus reducing the need to process all the sound data from the glass break sensor at the gateway entity 20.

If a device at the lower level 34 of the hierarchy 32 is unable to process some input data (or is not configured to do so), the device forwards the data to a device at the intermediate level 36 of the hierarchy 32. The intermediate level 36 includes gateway entities, such as control panels, local computing devices, and (in some situations) mobile devices such as cell phones and tablets. Such devices typically have improved processing and power capabilities as compared to devices at the lower level 34, which makes them well-suited to most processing tasks. Devices at the intermediate level 36 can perform more general-purpose analyses (as opposed to the special-purpose analyses performed at the lower level 34) and/or perform more complex analyses as compared to the lower level 34.

Devices at the intermediate level 36 may occasionally become overwhelmed in the presence of many data processing requests, or may encounter a processing task that is beyond its capabilities. In this case, processing tasks may be pushed up the hierarchy to the higher level 38. At the higher level 38, cloud- and third-party-processing devices perform complex tasks on behalf of the system.

Devices at different levels of the hierarchy 32 (and different devices at the same level of the hierarchy 32) may include different logic for processing the same data. For example, a smoke detector at the lower level 34 and a gateway entity at the intermediate level 36 may both have logic for analyzing smoke detector data to determine if there is a fire in the monitored zone. However, the gateway entity's logic may be more sophisticated than the smoke detector's logic. Thus, the smoke detector and the gateway entity could process the same data and come to different conclusions. This capability may be advantageously leveraged to provide a targeted and sophisticated analysis of the data. If a device at a lower level of the hierarchy processes data and determines that it nearly, but does not quite, indicate the presence of an alarm condition (e.g., the results of the processing do not exceed an alarm threshold but do approach the threshold within a predefined tolerance), then the lower level device may forward the data to another device in the architecture that has a more sophisticated or different processing capability.

Moreover, different devices at the same level of the hierarchy 32 may have different logic for processing data. Accordingly, different devices can be made to employ location-dependent or context-sensitive processing logic. For example, a smoke detector deployed in a kitchen may be provided with logic for eliminating false alarms due to cooking, while a smoke detector deployed in a front hallway may omit this logic.

The logic deployed on a device can be dependent on the hardware configuration of the device. For example, a sensor having new or improved hardware may deploy more complex or specialized processing logic as compared to an older or simpler sensor. In addition to providing location- or context-sensitive processing, this capability allows a device at one level in the hierarchy 32 to forward data to another, more specialized device (possible via a gateway entity) when presented with data that can be better handled by the specialized device.

In addition to improved processing, another advantage of the hierarchy 32 is that improved configuration settings can be developed at the upper levels of the hierarchy 32 (e.g., the intermediate level 36 and the higher level 38) and pushed down to lower levels of the hierarchy 32. For example, if a sensor at the lower level 34 determines that input data nearly, but does not quite, rise to the level of an alarm condition, the sensor may forward the input data to a device at the intermediate level 36 for further processing. If the device at the intermediate level 36 determines that the data should have triggered an alarm condition, the device at the intermediate level 36 may review the configuration of the device at the lower level 34 to determine if one or more configuration settings should be changed so that the lower level device can better analyze input data in the future. For example, the device at the intermediate level might lower the alarm threshold of the lower level device, or might alter the algorithm employed by the lower level device based on the algorithm used by the intermediate level device or another device in the architecture 10.

The structures of exemplary devices in the hierarchy, particularly an exemplary sensor 14 and an exemplary gateway entity 20, are now described with reference to FIGS. 3 and 4.

Figure 3:
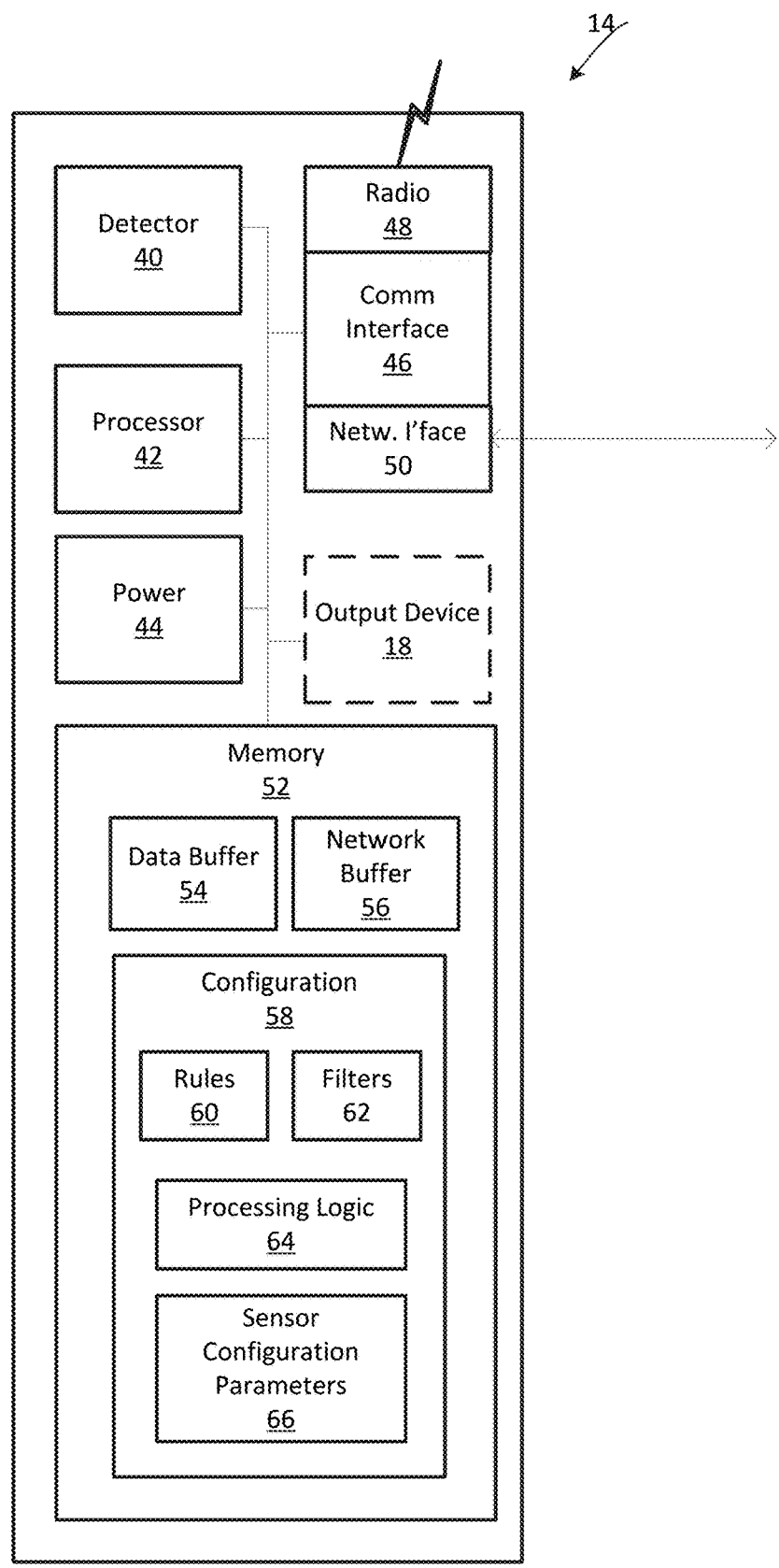
FIG. 3 is a block diagram illustrating an exemplary sensor device or output device in accordance with the present disclosure.
Figure 4:
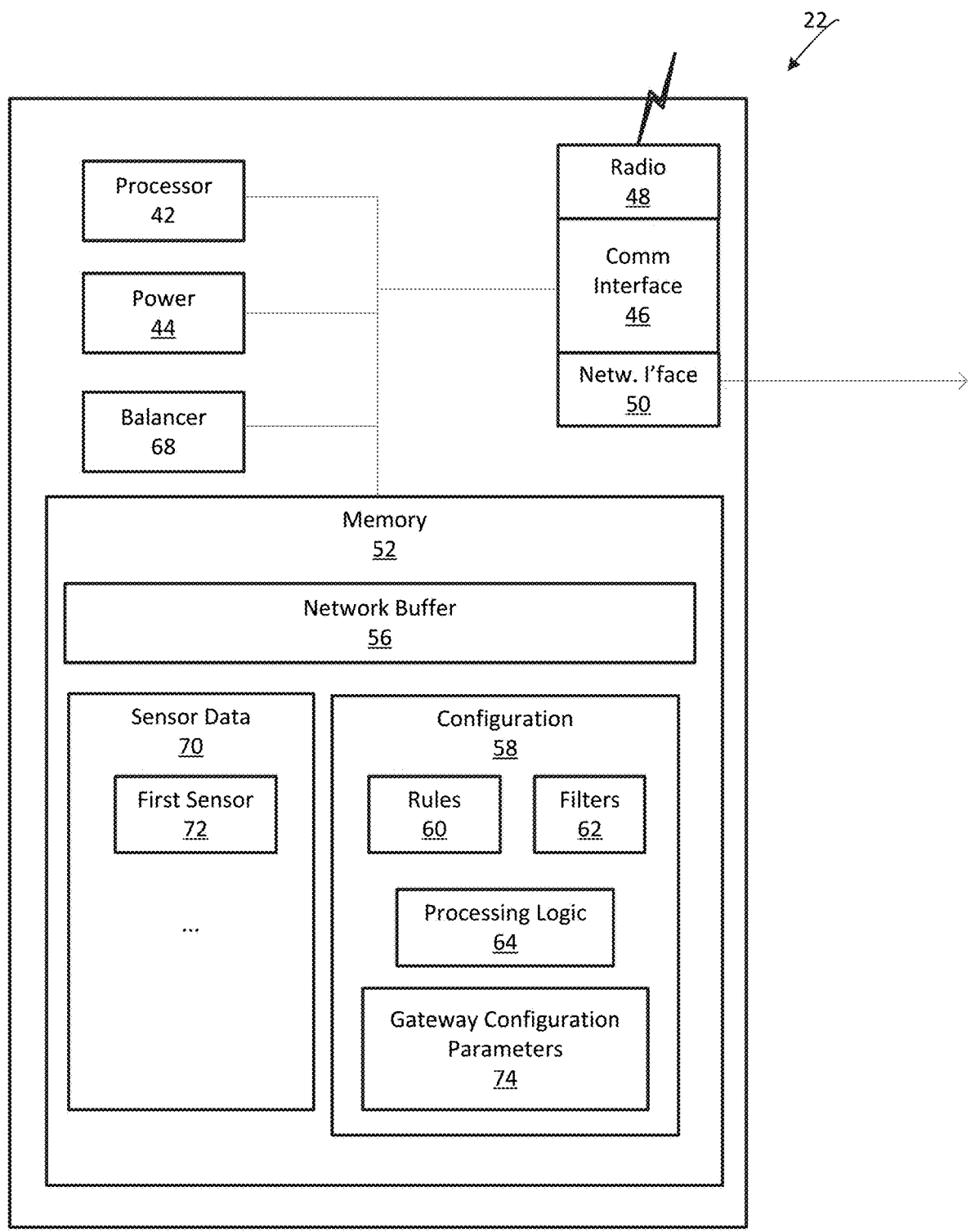
FIG. 4 is a block diagram illustrating an exemplary gateway entity in accordance with the present disclosure.

The sensor 14 depicted in FIG. 3 includes a detector 40. Detectors include devices that measure or identify a phenomenon and provide an output in response to the presence of the phenomenon, the absence of the phenomenon, or a change in the phenomenon. Examples of detectors include light or image sensors, microphones, thermometers/thermocouples, barometers, etc.

The output of the detector 40 is processed by a processor 42. Processors 42 include devices that execute instructions and/or perform mathematical, logical, control, or input/output operations. The processor 42 of the sensor 14 may be a specialized processor having limited processing capabilities and designed to run in low-power environments. For example, the processor 42 of the sensor 14 may implement the Reduced Instruction Set Computing (RISC) or Acorn RISC Machine (ARM) architecture. Examples of processors 42 include the Atom™ family of processors from Intel Corporation of Santa Clara, Calif., the A4 family of processors from Apple, Inc. of Cupertino, Calif., the Snapdragon™ family of processors from Qualcomm Technologies, Inc. of San Diego Calif., and the Cortex® family of processors from ARM Holdings, PLC of Cambridge, England. The processor 42 may also be a custom processor.

The sensor 14 includes a power interface 44 for supplying electrical power to the components of the sensor 14. The power interface 44 may be a connection to an external power source, such as a hard-wired connection to a house's or business' power supply. Alternatively or in addition, the power interface 44 may include an interface to a rechargeable or non-rechargeable battery, or a capacitor.

The exemplary sensor 14 engages in wireless and wired communication. Accordingly, the sensor 14 includes a communication interface 46 for managing communication between the sensor 14 and other entities in the architecture 10. The communication interface 46 accepts incoming transmissions of information from the other entities in the architecture 10, manages the transmission of information from the sensor 14 to the other entities, and provides quality control for data transmissions, among other communication-related functionality. The sensor 14 may connect to the network 22 through the communication interface 46.

The communication interface 46 wirelessly communicates with the other entities of the architecture 10 using a radio transmitter/receiver 48. The radio transmitter/receiver 48 modulates and demodulates electromagnetic signals carried wirelessly through a medium, such as the air or water, or through no medium (such as in space). In exemplary embodiments, the radio transmitter/receiver 48 of the sensor 14 may be a specialized radio transmitter/receiver that communicates over a relatively short range using relatively low power. Examples of lower-power radio transmitter/receivers 48 include devices communicating through short-wavelength ultra-high frequency (UHF) radio waves. Exemplary low-power radio transmitter receivers 48 may implement a communication protocol such as a ZigBee protocol from the ZigBee Alliance, the Bluetooth® Low Energy (BLE) protocol of the Bluetooth Special Interest Group, the Z-Wave protocol of the Z-Wave Alliance, the IPv6 over Low Power Wireless Personal Area Networks (6LoWPAN) protocol developed by the Internet Engineering Task Force (IETF), or a near field communications (NFC) protocol.

Alternatively or in addition, the sensor 14 could engage in wireless communication using other transmission/reception technologies, such as free-space optical, sonic, or electromagnetic induction.

The exemplary communication interface 46 also connects to a network interface 50 for interfacing with a wired communications network. The network interface 50 may be, for example, a network interface controller (NIC) for establishing a wired connection to a computer network such as the Internet, a fiber optic interface for connecting to a fiber optic network, a cable interface for connecting to a cable television network, a telephone jack for connecting to a telephone network, or a power-line interface for connecting to a power-line communications network.

Optionally, the sensor 14 may include an output device 18. For example, a smoke detector may include a sensor for detecting the presence of smoke, and one or more output devices (e.g., a siren and a strobe light) that are triggered based on the output of the sensor.

The sensor 14 includes a memory 52 for holding data, instructions, and other information for use by the other components of the sensor. In exemplary embodiments, the memory 52 of the sensor 14 may be a specialized memory that includes relatively limited storage and/or uses relatively low power. The memory 52 may be solid-state storage media such as flash memory and/or random access memory (RAM). Examples of memory 52 include Secure Digital™ (SD) memory from the SD Association. The memory 52 may also be a custom memory.

The memory 52 includes a data buffer 54 for temporarily storing data from the detector 40 until the data can be processed by the processor 42 or transmitted using the communication interface 46. The data buffer 54 may be, for example, a circular buffer. Data in the data buffer 54 may be processed on a first-in-first-out (FIFO) basis, a last-in-first-out (LIFO) basis, based on an importance of individual data units in the buffer, or based on a custom processing order. The data buffer 54 may be located at a fixed location in the memory 52.

In addition to the data buffer 54, the memory 52 includes a network buffer 56 for storing information transmitted or received via the communication interface 46. The processor 42 assembles data for transmission by the communication interface 46, and stores the data units in the network buffer 56. The communication interface 46 regularly retrieves pending data from the network buffer 56 and transmits it towards its destination. Upon receiving data from another device of the architecture 10, the communication interface 46 places the data in the network buffer 56. The processor 42 regularly retrieves pending data from the network buffer and processes the data according to instructions stored in the memory 52 or hard-coded into the processor 42. In order to distinguish between received data and data to be transmitted, the network buffer 56 may be subdivided into an "in" buffer and an "out" buffer. The network buffer 56 may be located at a fixed location in the memory 52.

The memory 52 furthermore stores a configuration 58 including rules 60, filters 62, processing logic 64, and configuration parameters 66. A configuration 58 is a description of hardware and/or software present on a device. Rules 60 describe one or more actions that occur in response to one or more conditions. Filters 62 are logic that is run on input and/or processed data in order to determine a next action to take with the data (such as processing the data locally, saving the data in a log, or forwarding the data to another device for processing). Processing logic 64 provides instructions and/or parameters that operate on input data (or, in some examples, no input data) to generate new output data, transform the input data into new data, or take an action with respect to the input data or some other data. Processing logic 64 may be applied to the data generated by the detector 40 in order to take an action, such as raising an alarm, changing a security or monitoring state of the architecture 10, operating an output device, etc. The gateway entity 20 may be deployed with different types of processing logic 64, the different types being respectively specialized to different types of sensor data. Configuration parameters 66 include values for settings that describe how the hardware and/or software of the configured device operates. The configuration 58, rules 60, filters 62, processing logic 64, and configuration parameters 66 are described in more detail in connection with FIGS. 7-10B, below.

At least one communication link that the sensor 14 uses to communicate (e.g., the link to the gateway entity 20) is a critical timing path 24. As noted above, the critical timing path 24 carries time-sensitive data between, for example, the sensor 14 and the gateway entity 20. Accordingly, the critical timing path 24 may require real-time or near-real-time transmission of data. The processor 42, communication interface 46, and memory 52 of the sensor may be configured to prioritize time-sensitive data such that the data is processed, transmitted, and acted upon quickly. For example, time sensitive data from the detector 40 may be flagged with a special header by the processor 42. The time sensitive data may be analyzed, using the processing logic 64, in an expedited manner (e.g., the time sensitive data may be prioritized over other, non-time sensitive data). If the time sensitive data is to be processed at another device in the hierarchy 32, the time-sensitive data may be placed into a high-priority, segregated area of the network buffer 56 or sent directly to the communication interface 46 for transmission. The communication interface 46 may append a special header to the time-sensitive data, marking the data as high-priority. Upon receiving data with a high-priority header, the communication interface 46 may place the data in the high-priority area of the network buffer 56 and/or announce the arrival of the data to the processor 42.

The communication interface 46 establishes one or more high-priority communication channels between the sensor 14 and the gateway entity 20. The high-priority communication channels may be broadband channels so as to ensure that sufficient bandwidth exists to transmit the data in real-time or near-real-time. The high-priority communication channels may be redundant, such that backup channels are available if one of the communication channels ceases to work. Redundancy may be established by using multiple different types of transmission mediums (e.g., wired and wireless mediums, different types of wired mediums, etc.), using different routes between the sensor 14 and the gateway entity 20 (e.g., a direct communication route to the gateway entity 20 and in indirect route from the sensor 14 through another device, such as another sensor 16, to the gateway entity 20), establishing alternative processing devices (e.g., establishing a communication channel to the cloud processing device 28, in the event that the gateway entity is unreachable or unable to process sensor data), and other possibilities.

Similar procedures for time-sensitive data may be used at the gateway entity 20.

The sensor 14 depicted in FIG. 3 primarily communicates with the gateway entity 20, which may be similar to the sensor 14 in terms of the types of components used. However, because there are fewer constraints on the gateway entity 20 in terms of size, location, and power consumption, the gateway entity 20 may have more and/or more powerful components than the sensor 14. Typically, the gateway entity 20 is a panel or computing device located in or near the monitored zone 12. FIG. 4 is a block diagram depicting the structure of an exemplary gateway entity 20.

The gateway entity 20 includes a processor 42. The processor 42 of the gateway entity 20 may be similar to the processor 42 of the sensor 14; alternatively or in addition, the processor 42 of the gateway entity 20 may be a Central Processing Unit (CPU) having one or more processing cores, one or more coprocessors, and/or on-chip cache.

In some embodiments, the processor 42 of the gateway entity 20 may be a specialized processor having improved processing capabilities as compared to the processor 42 of the sensor 14 and, as a result, may exhibit increased power consumption and/or heat generation as compared to the processor 42 of the sensor 14. For example, the processor 42 of the gateway entity 20 may implement the Complex Instruction Set Computing (CISC) architecture. Examples of processors 42 include the Celeron®, Pentium®, and Core™ families of processors from Intel Corporation of Santa Clara, Calif., and the Accelerated Processing Unit (APU) and Central Processing Unit (CPU) processors from Advanced Micro Devices (AMD), Inc. of Sunnyvale, Calif.

The gateway entity 20 further includes a power interface 44. The power interface 44 may connect directly to the power distribution system or power grid at the location in which the gateway entity 20 is deployed. The power interface 44 may include an interface for accepting alternating current (AC), direct current (DC), or both. The power interface 44 may include a converter for converting AC to DC, or vice versa. The power interface 44 may include a battery back-up in order to run the gateway entity 20 during power outages.

The gateway entity 20 includes a communication interface 46, radio 48, and network interface 50 similar to the respective components of the sensor 14. The gateway entity 20 may be expected to communicate with more devices than the sensor 14, and accordingly may be provided with more or more complex communication interfaces 46, radios 48, and network interfaces 50 than the sensor 14. The gateway entity 20 may be assigned to a particular monitored zone 12, and accordingly may maintain communication with the devices in the monitored zone 12 through the communication interface 46. The gateway entity 20 may also connect to the network 22 through the communication interface 46.

The gateway entity 20 includes a memory 52. The memory 52 of the gateway entity 20 may be similar to the memory 52 of the sensor 14, but typically exhibits greater storage space and/or improved performance (such as improved read/write times, improved seek times, and/or improved data redundancy or information backup capabilities). Examples of memory 52 suitable for use at the gateway entity 20 include random access memory (RAM), a hard disk drive (HDD), or a solid state drive (SSD), among other possibilities, or a combination of the same or different types of information storage devices.

The memory 52 provides a network buffer 56 similar to the network buffer 56 of the sensor 14. The memory 52 also includes a storage area for sensor data 70, which includes sensor data from the sensors in the monitored zone 12 overseen by the gateway entity 20 (e.g., first sensor data 72, second sensor data, etc.). The sensor data 70 may be stored on a separate partition of the memory 52 as compared to other elements stored in the memory 52.

The memory 52 of the gateway entity 20 also stores a configuration 58, rules 60, filters 62, processing logic 64, and gateway entity configuration parameters 74. These elements may be similar in structure to the respective elements of the sensor 14, although they may differ in content (e.g., different conditions and actions in the rules 60, different ways to filter the data in the filters 62, different instructions in the processing logic 64, different values in the configuration parameters 74, etc.).

The gateway entity 20 further includes a balancer 68, which performs a double-balancing process to allocate resources (e.g., processing resources, memory resources, etc.) in the architecture 10. The balancer 68 receives event notifications when a sensor determines that an event is taking place or is about to take place. In response, the balancer 68 allocates resources at the gateway. For example, the balancer 68 may allocate space in the memory 52 for data 72 from the sensor 14, and/or may generate new threads or otherwise allocate processing resources within the processor 42. The double balancing process is described in more detail in FIGS. 5 and 11-14B.

As noted above, the gateway entity 20 forwards some data to a cloud processing device 28 for further processing. The cloud processing device 28 has a structure similar to that of the gateway entity 20. For the sake of avoiding redundancy, the structure of the cloud processing device 28 is not shown separately. The cloud-processing device 28 may be deployed in a manner that allows qualitatively and quantitatively improved components, as compared to the gateway entity 20. For example, the memory of the cloud processing device 28 may include several hard disk drives (HDDs) or solid state drives (SDDs), among other storage possibilities. The memory of the cloud processing device 28 may be arranged into a redundant array of independent disks (RAID) configuration for reliability and improved performance.

Moreover, the processor the cloud processing device 28 may be qualitatively or quantitatively more powerful than the processor 42 of the gateway entity 20. For example, multiple processors 42 may be provided in the cloud processing device 28, which may include more processing cores than the processor 42 of the gateway entity 20. Furthermore, the processor(s) 42 of the cloud processing device 28 may be of a different, more powerful type than the processor 42 of the gateway entity 20. For example, the cloud processing device 28 may employ a more powerful central processing unit (CPU) than the gateway entity 20, or may employ more or better coprocessors than the CPU of the gateway entity 20, or may employ a graphical processing unit (GPU) that is more powerful than the CPU of the gateway entity 20.

Figure 5:
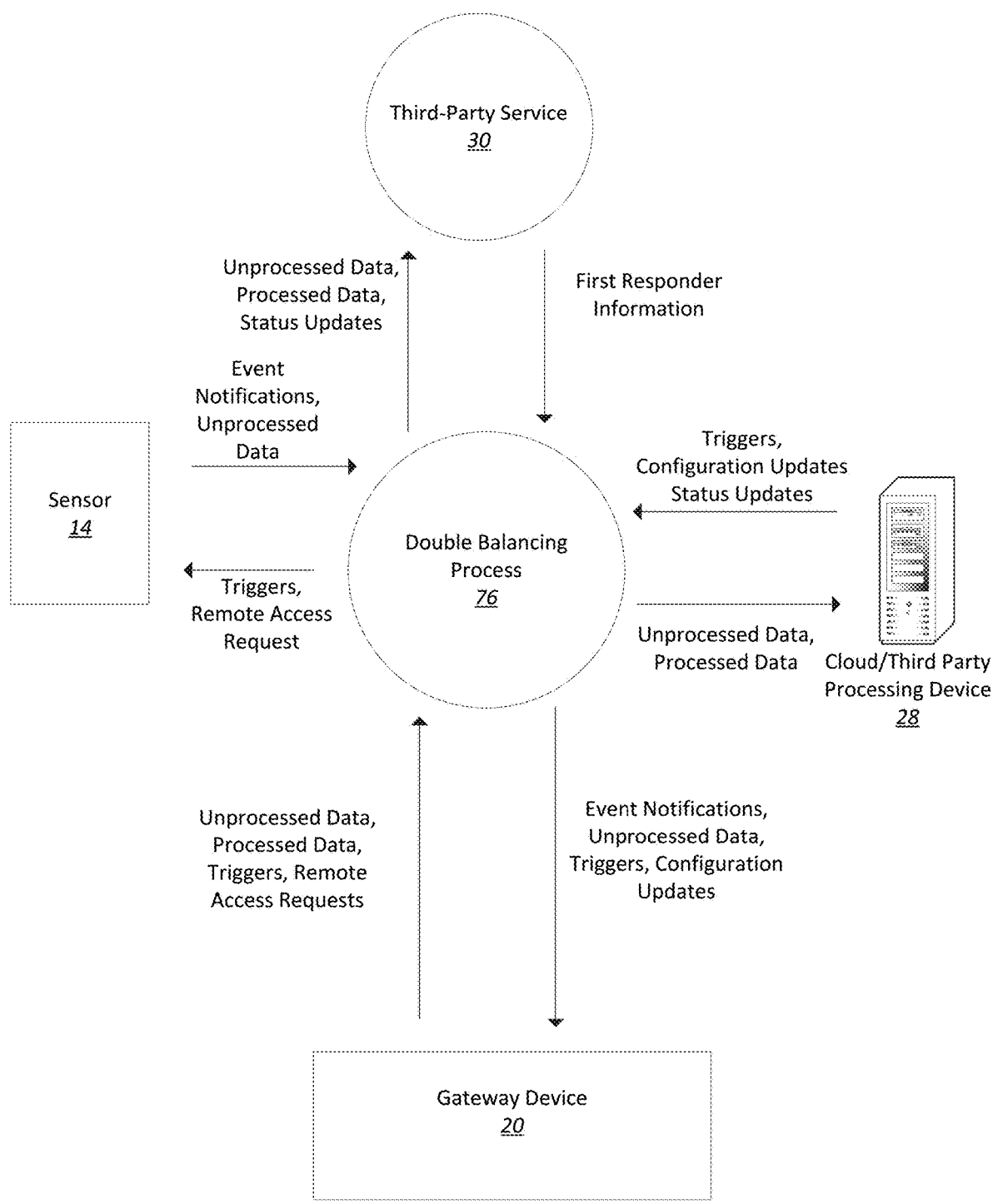
FIG. 5 is a system context diagram illustrating exemplary interactions between the devices of the system architecture from the perspective of the gateway entity in accordance with the present disclosure.

As shown in FIG. 5, the sensor 14, gateway entity 20, the cloud processing device 28, and the third-party service 30 may interact with each other, and with other elements of the architecture 10, in order to process sensor data. FIG. 5 is a system context diagram showing how, in an exemplary embodiment, entities of the system architecture 10 interact with each other according to a double-balancing process 76. The double-balancing process 76 encompasses the steps or actions performed by the architecture 10 in order to balance the processing sensor data and manage the entities of the architecture 10. The double-balancing process 76 includes actions described in more detail in the flow diagrams of FIGS. 11-14B.

The sensor 14 generates input data for the double balancing process 76 using the detector 40. The input data is stored in the sensor's data buffer 54 until it can be processed by the processor 42. The processor 42 retrieves the data from the data buffer 54 and makes an initial determination, based on a filter 62, to either process the data locally or forward the data to another device in the architecture 10 for processing.

If the data is processed locally and the sensor determines that an event is occurring or predicted to occur (e.g., an alarm condition is indicated or considered to be likely), the sensor 14 generates, as an output to the double balancing process 76, an event notification. An event notification flags the occurrence or prediction of the event for the gateway entity 20, so that the balancer 68 of the gateway entity 20 can begin to allocate resources and respond to the event. An event notification message may indicate that the event is occurring or likely to occur, or the event notification may indicate that a previously-flagged event has ended.

In some embodiments, the event notification includes characteristics of the sensor 14, such as initial data from the sensor 14, information about the configuration of the sensor 14 (e.g., details about the firmware, software, hardware, etc.), a model identification of the sensor 14, the type of the sensor 14 (e.g., smoke detector, glass break sensor, etc.), or maintenance information (e.g., measurements of the resistance across various points in the circuitry of the sensor 14, measurements of a battery level or network connectivity of the sensor 14, power consumption of the sensor 14, etc.).

If the processor 42 determines that the data cannot or should not be processed locally, then the sensor 14 generates, as an output to the double balancing process 76, a message including the unprocessed data for processing by another device in the architecture 10. Unprocessed data includes data (e.g., data generated by the sensor 14) that is designated by the double balancing process 76 for processing by a device different than the device on which the unprocessed data presently resides.

Unprocessed data may include data that is partially processed by the device on which the unprocessed data presently resides. For example, the sensor 14 may perform partial processing of the data, and forward some or all of the raw data, along with processing results, to the double balancing process 76 as unprocessed data. In other embodiments, the unprocessed data may be completely processed by the sensor 14, but may nonetheless be forwarded to another device for more consideration.

In some embodiments, the sensor 14 registers data with the detector 40 that is used for sound and speech recognition. For example, the detector 40 may receive speech data as an input and either locally process the speech data with the processor 42, or forward the speech data to the double balancing process 76 as unprocessed data. The speech data may be used for voice recognition and/or authentication to the architecture 10. For example, the speech data may be used to authenticate a user when the user enters the monitored zone 12. If the user fails to authenticate, the sensor 14 may send an event notification to trigger an alarm condition indicating an unauthorized user's presence in the monitored zone 12.

The sensor 14 receives, as output of the double balancing process 76, triggers and remote access requests. A trigger is an instruction from another device, such as the gateway entity 20, to change the sensor's state or take an action (e.g., sound an alarm, turn on a strobe, or play an audio recording) in response to the detection of an event from the other device. For example, a trigger may inform the sensor 14 that the architecture 10 is in an alarm configuration, and internal rules of the sensor 14 may provide a particular type of notification in response (e.g., triggering an integrated output device 18 of the sensor 14). Alternatively or in addition, the trigger message may instruct the sensor 14 to perform a task (such as sounding an alarm or changing a temperature setting in the monitored zone 12).

A remote access request is a request from a device in the architecture 10 directing the sensor 14 to yield control over some or all components of the sensor 14 to an external entity. For example, a remote access request could command the sensor 14 to provide audio of visual data from the sensor's data buffer 54 and/or detector 40. The remote access request could also command the sensor 14 to cede control of an output device, such as a speaker, so that a remote entity can communicate through the output device and/or a detector (such as a microphone). The remote access request could also request that the sensor 14 reposition itself (as in the case of a remotely-operated video camera that pans, tilts, or rotates in response to commands from the external entity), among other possibilities.

The third-party service 30 monitors the state of the devices and zones of the architecture 10 for conditions that require further action (such as dispatching emergency services or contacting a user). Accordingly, the third-party service 30 is provided with, as an output of the double balancing process 76, status updates indicative of any change in the security or monitoring state of the architecture 10. Moreover, the third party service 30 may receive processed or unprocessed data as an output of the double balancing process 76, which may allow the third party service 30 to monitor the state of the sensors in the monitored zone 12. For example, the third-party service 30 may receive raw data from a sensor such as a smoke detector, and/or processed data summarizing events that led up to an alarm condition, among other possibilities.

On the basis of the status updates and processed or unprocessed data, the third-party service 30 may contact, or may facilitate contact with, first responders such as medical services, fire or police departments, a private security company, etc. Accordingly, the third party service 30 may provide, as an input to the double balancing process 76, first responder information. The first responder information may include information (such as selected portions of the processed or unprocessed data) that assists the first responders in handling an event. For example, the first responder information might include Global Positioning System (GPS) coordinates indicating the location of a sensor 14 that is currently presenting an alarm condition. The first responder information may originate at the sensor 14, the gateway entity 20, or the cloud processing device 28, or may be stored at the third-party service 30.

The cloud processing device 28 provides additional processing capabilities for the architecture 10. For example, the cloud processing device may perform more advanced processing using more complex algorithms than the gateway entity 20, may support the gateway entity 20 by pre-calculating information that simplifies calculations performed by the gateway entity 20 (e.g., by generating an interaction dictionary that provides a limited number of choices that the gateway entity 20 can select when engaging in automated voice interactions with a user), may perform advanced data analytics on the basis of the data from one or more sensors, and/or may log data for future reference or to comply with applicable regulations.

In order to use these additional processing capabilities, the double balancing process 76 sends, as an output, unprocessed data (and/or processed data) to be processed at the cloud processing device 28. The unprocessed and/or processed data may originate from a single sensor 14, or data from multiple sensors may be considered holistically.

The cloud processing device 28 processes the received data and makes a determination (e.g., to change the security or monitoring state of the architecture 10) based on the data. Accordingly, the cloud processing device 28 may transmit, as an input to the double balancing process 76, a status update describing how to change the state of the architecture 10 and/or a trigger for a sensor 14 or output device 18. The cloud processing device 28 may also transmit "null" status update messages, indicating that the security or monitoring state of the architecture 10 does not need to be changed in response to the data.

Moreover, the cloud processing device 28 initiates calls to monitoring stations and first responders. For example, the cloud processing device 28 may send a signal to the third-party service 30 indicating the presence of an event (such as a fire or break-in), and may direct the third-party service to call 911. Alternatively, the cloud processing device 28 may initiate a 911 call and then hand the call over to the third-party service 30.

As noted above, one advantage of the architecture 10 is that updates to the processing logic used to analyze sensor data may be deployed on the gateway 20, without the need to push the new updates all the way to the sensors. In some embodiments, the cloud processing device 28 determines how the configuration of the gateway entity 20 should be updated. For example, if the gateway entity 20 processes data and decides not to trigger an alarm, but the cloud processing device 28 determines that an alarm should have been triggered, the cloud processing device 28 may automatically send a configuration update to the gateway entity 20 to lower the gateway entity's detection thresholds. Alternatively, if the cloud processing device 28 determines that an alarm should not have been triggered by the gateway entity 20 (but was triggered), the cloud processing device 28 may automatically send a configuration update to the gateway entity 20 to raise the gateway entity's threshold. In another example, the cloud processing device 28 may determine that a gateway entity's configuration is out-of-date and that a more up-to-date configuration exists on another nearby device. The cloud processing device 28 may send a configuration update to the out-of-date gateway entity based on the configuration of the up-to-date device.

Accordingly, the cloud processing device 28 transmits, as an input to the double balancing process 76, a configuration update to be applied at the gateway entity 20. Configuration updates include messages describing a change in the configuration 58 of the gateway entity 20. For example, configuration updates may update rules 60, filters 62, processing logic 64, and/or configuration parameters 74 of the affected gateway entity 20.

The gateway entity 20 functions as a central hub or facilitator between the sensors/output devices and external devices accessible through the network 22. Among other functions, the gateway entity 20: allocates resources to particular sensors or groups of sensors in response to event notifications; processes data from the sensors in the architecture 10; forwards unprocessed data to other devices that are better-suited to process the data; transmits status updates to the third-party service 30; triggers output devices; sends remote access requests to sensors; provides access to video/audio recorded data to the third-party service 30; and applies configuration updates from the double balancing process 76. In some embodiments, the gateway entity 20 also generates vocal prompts and audio feedback using text to speech and natural language processing based on the interaction dictionary from cloud processing device 28. The gateway entity 20 may expose one or more Application Program Interfaces (APIs) to the other devices in the architecture 10 for these purposes.

The double balancing process 76 accepts the inputs from the various devices as shown in FIG. 5, and processes the inputs to generate outputs. As part of the double balancing process 76, a number of different data structures may be employed. Exemplary data structures suitable for use with embodiments are described below with reference to FIGS. 6-10B.

Figure 6:
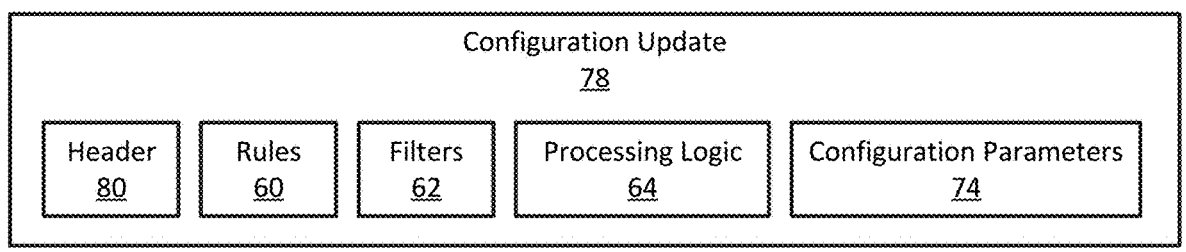

FIG. 6 shows an exemplary configuration update 78 that is used to update the configuration 58 of a gateway entity 20.

The configuration update 78 includes a header 80 that identifies, among other things, the destination for the configuration update 78. In some embodiments, the header 80 identifies specific devices on which the configuration update 78 should be deployed. Alternatively or in addition, the header 80 may identify a group or class of devices on which the configuration update 78 should be deployed (e.g., gateway entities that oversee at least one smoke detector).

In some embodiments, the header 80 also includes other information, such as a timestamp, a priority, and a checksum. The timestamp identifies the time at which the configuration update 78 was sent, which may be used to order configuration updates arriving in succession. In some cases, two configuration updates may conflict with each other, thus requiring that one configuration update override the other. The timestamp can be used to determine which configuration update was sent first (under the assumption that the latter configuration update was meant to override the former). If a first configuration update was transmitted before a second configuration update, then in some embodiments the later (second) configuration update is applied and overrides the first configuration update, regardless of the order in which the configuration updates are received at the device to be configured.

In some embodiments, a priority value is used to determine which configuration update should override other configuration updates. For example, if a first configuration update is received having a high priority and is applied at a configured device, the configured device may decide not to apply a subsequent conflicting configuration update having a lower priority.

A checksum in the header 80 is used to verify that the configuration update 78 was received correctly and not garbled in transmission. The checksum is applied at the transmitting device by calculating a checksum value over the payload of the configuration update 78, using any of a number of well-known checksum algorithms. The calculated checksum is added to the header 80. Upon receipt of the configuration update 78, a checksum value is calculated over the payload of the configuration update 78, and is compared to the checksum in the header 80. If the two checksums match, then the configuration update 78 is determined to have been received successfully. If the two checksums do not match, then the receiving device determines that an error occurred in transmission or reception, and requests that the configuration update 78 be re-transmitted.

The different elements in the configuration update 78 may be separated by a designated character (such as an End of Line character, or a comma, or any other suitable character). When the configuration update 78 is parsed by the receiving device, the receiving device may separate the different elements based on the designated characters, and may modify the corresponding elements of the configuration 58 of the configured device. Alternatively or in addition, the different elements in the configuration update 78 may be provided at predefined locations in the configuration update, or may have a predefined size, or may have a variable size that is reported in the header 80. Upon receiving the configuration update 78, the receiving device may separate the elements of the configuration update based on their position in the message and/or size.

Although the configuration update 78 is shown with updated rules 60, filters 62, processing logic 64, and configuration parameters 74, some of these items may be omitted from the configuration update 78. For example, if only the rules 60 (or a portion of a rule 60) are updated in a given configuration update 78, then the remaining items are omitted from the configuration update 78. The header 80 indicates which elements are updated in a given configuration update 78.

Figure 7:
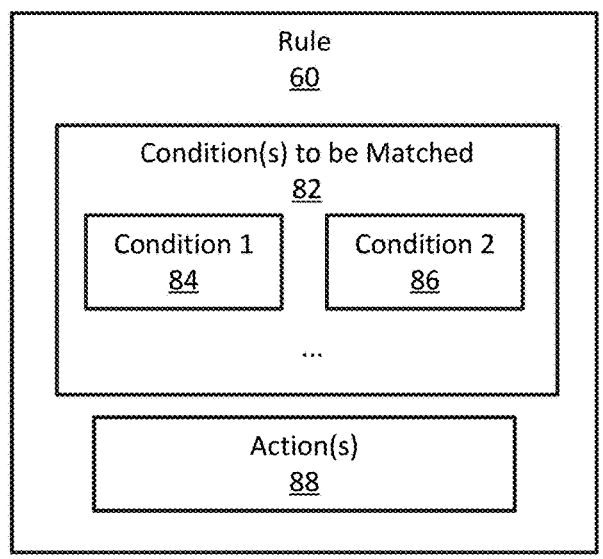

An example of a rule 60 suitable for use in a configuration 74 or configuration update 78 is shown in FIG. 7. The rule 60 attempts to match a set of conditions 82 (e.g. a first condition 84, a second condition 86, etc.), as defined in the rule 60, to conditions in the architecture 10. When the set of conditions 82 is met, then one or more actions 88 are triggered.

A condition is a predefined set of states, statuses, or value for parameters that a device attempts to match against states, statuses, or parameters in the architecture 10. Examples of conditions 82 include matching a state of the architecture or a device to a predefined value or value range (e.g., the current security level is 1, 2, or 3; the smoke detector is in an "alarm" mode). Multiple states may be matched in a single condition (e.g., two smoke detectors separated from each other by more than a predefined distance are in an "alarm" mode; a glass break sensor is tripped and a motion detector detects motion in the room). One or more of the conditions 82 may be time-based (e.g., the current time is 10:30 AM; the current time is between 10:00 PM and 6:00 AM).

The set of conditions 82 may be an empty set (i.e., no conditions), in which case the action 88 is carried out immediately upon receiving the rule 60, and subsequently discarded. Alternatively, custom logic may be applied to define how to carry out rules having no associated conditions 82.

Some or all of the conditions 82 may be specified using logical operators such as AND, OR, XOR, NOT, etc. For example, the rule 60 may specify that the first condition 84 and the second condition 86 must both be met for the action 88 to be triggered. Alternatively, the rule 60 might specify that either the first condition 84 or the second condition 86 must be met to trigger the action 88.

When the set of conditions 82 is matched to a current status of the architecture 10 or device(s), the action 88 specified in the rule is carried out. An action 88 is a set of one or more instructions or tasks to be carried out by the device on which the rule 60 is triggered. Examples of actions 88 include performing a task locally (e.g., trigger an integrated notification device; process additional data) and forwarding instructions to other devices (e.g., send a status update to the gateway 20, escalate the security level of the architecture 10; trigger the dishwasher to start running).

A rule 60 can specify a number of times that the rule is to be carried out. This may be done, for example, by specifying a maximum number of applications as one of the conditions 84, and tracking the number of times that the rule 60 has caused the action 88 to be triggered. Upon reaching the maximum number of applications, the rule 60 is discarded.

In addition to rules 60, the configuration update 78 specifies filters 62. Two examples of filters 62 are shown in FIGS. 8A and 8B. FIG. 8A depicts an exemplary processing determination filter 90, which is a pre-processing filter applied to data present on a local device to determine if the data should initially be processed locally, or forwarded to a different location in the architecture 10 for processing. FIG. 8B depicts an exemplary escalation filter 102, which is a post-processing filter applied after data is processed locally in order to determine if the data should be further processed by other devices in the architecture 10.

As shown in FIG. 8A, the processing determination filter 90 includes evaluation logic 92. The evaluation logic 92 accepts input data and/or contextual information about the data (e.g., the type of sensor(s) that generated the data, the location at which the sensor(s) were deployed, any initial processing that has been done on the data, etc.) and evaluates the data to determine whether the data should be processed locally.

The exemplary evaluation logic 92 evaluates the input data and/or contextual information against one or more thresholds 94 to determine whether the data should be processed locally. A threshold 94 represents a magnitude or intensity that must be met or exceeded in order for a given result to occur. In the example of the evaluation logic, the thresholds 94 represent dividing lines which cause certain predefined actions to be performed depending on whether a measured parameter falls on one side or the other of the threshold 94.

In the exemplary processing determination filter 90, the data is compared against a complexity threshold 96. A complexity threshold 96 represents a maximum complexity that the local device is capable of tolerating in data while still being capable of efficiently processing the data. In the exemplary embodiment, the evaluation logic 92 analyzes the data and the contextual information about the data, and assigns a complexity score to the data. The complexity score may be calculated by considering the type of sensor the data originated from, the amount of the data, whether the data values are stable or variable, whether the data is clear or noisy, whether the data includes any immediately recognizable patterns, etc.

If the complexity score meets or exceeds the complexity threshold 96, then the evaluation logic 92 determines that the data is too complex for processing at the local device. If the complexity score is below the complexity threshold 96, then the evaluation logic 92 determines that the local device is capable of processing the data.

The evaluation logic 92 also uses a load threshold 98 to perform load balancing. Load balancing refers to the distribution of tasks, jobs, or other work among multiple computing resources. In the exemplary embodiment, the evaluation logic 92 compares a load on the local processor(s) (e.g., a percentage of local processing resources currently being utilized, a number and/or complexity of jobs currently being processed, etc.) to the load threshold 98. If the current load meets or exceeds the load threshold 98 then the evaluation logic 92 may determine that the processing task under consideration should be processed elsewhere. If the current load is below the load threshold 98, then the evaluation logic 92 may determine that the processing task should be performed locally.

The evaluation logic 92 can be programmed with a list of accessible devices having computing resources available for use (e.g., the gateway entity 20), and an indication of the types of processing tasks the devices specialize in. If the evaluation logic 92 determines that a processing task should be forwarded to another device in the architecture, the evaluation logic 92 may consult the list to select an appropriate destination device.

The devices in the list can be associated with a priority indicating the order in which processing tasks should be sent to the listed devices. For example, among devices specializing in a particular type of data (e.g., smoke detector data), the devices can be ranked in order of priority. The next processing task received for that particular type of data may be sent to the highest-priority device in the list. A query may be sent to the highest priority device to determine whether the highest priority device is capable of performing a new processing task. If the highest priority device responds by acknowledging its willingness to perform the task, the data may be sent to the highest priority device for processing. If the highest priority device responds by rejecting the processing request, the local device may proceed to the next-highest priority device in the list. This process may be repeated until an appropriate device is selected.

Devices in the list may exchange messages (e.g., through the gateway entity 20) in order to change their priority ranking on other devices. For example, if a given device is assigned a large number of processing tasks and its processing load approaches to within a predefined tolerance of the device's load threshold 98, the overloaded device may send a message to the gateway entity 20 requesting that the overloaded device's priority be lowered in the evaluation logic 92 of other devices in the architecture 10. Accordingly, other devices will be less likely to send processing tasks to the overloaded device. When the overloaded device's processing load drops to a predefined level (or after a predetermined amount of time), the device's priority may be raised.

A local device may also change a remote device's priority in the local device's evaluation logic 92 as the local device assigns tasks to the remote device. For example, if a gateway entity 20 sends a processing job to a first sensor 14, the gateway entity 20 may lower the priority of the first sensor so that the next task is sent to a second sensor 16. Thus, the gateway entity 20 can distribute tasks more uniformly.

The list may also include a default device located at the next-highest level of the hierarchy 32 (as compared to the local device that is currently preparing to re-assign the processing task) to which tasks may be forwarded if no other device is identified. For example, the default device at the intermediate level 36 of the hierarchy 32 can be the gateway 20, and the default device at the higher level 38 of the hierarchy 32 can be the cloud- or third-party processing device 30.

In addition to determining whether the data should be processed locally or remotely, the processing determination filter 90 also applies a reporting ruleset 100 to any received data to determine whether the data should be logged in a local memory, forwarded to other specified devices in the architecture 10, or processed and discarded. The reporting ruleset 100 matches conditions 82 such as a type of data, an interval of time at which data should be recorded, recognized patterns in the data, etc. against the input data (potentially after the data is processed by the evaluation logic 92). If the conditions 82 match the data, the reporting ruleset 100 applies an action 88 such as storing the data in a local memory (e.g., the memory 52 of the sensor 14, or the memory 52 of the gateway entity 20) or forwarding the data to a device specified in the action 88.

If the processing determination filter 90 determines that the data should be processed locally, the data is processed according to the processing logic 72 of the local device. After processing by the processing logic 72, the device applies an escalation filter 102, as shown in FIG. 10B, to determine if the data should also be escalated to another device for further processing.

The escalation filter 102 is applied if the processing logic 72 decides to take any action, decides to take a specific action (such as raising an alarm), decides to take no action, or any combination of possibilities.

The escalation filter 102 has evaluation logic 104 that determines whether processed data should be escalated by being further processed at another device. The evaluation logic 104 decides to escalate the data for further processing if the processing logic 72 is unable to process the data. For example, if the data is voice data that includes commands, and the processing logic 72 is unable to identify the commands in the voice data with a high degree of confidence, the evaluation logic 104 may escalate the data for further processing at a higher level of the hierarchy 32.

The evaluation logic 104 consults a threshold 106, such as an escalation threshold 108, in order to determine if the data should be escalated. In one exemplary embodiment, the escalation threshold 108 applies when the processing logic 72 determines not to take an action, but was within a predefined tolerance of taking the action (suggesting that the determination may be a false negative). Alternatively or in addition, the escalation threshold 108 applies when the processing logic 64 determines to take an action, but was within a predefined tolerance of not taking the action (suggesting that the determination result may be a false positive). The escalation threshold 108 is a value or range of values defining these tolerances.

For example, the processing logic 64 may trigger an alarm at an output device 18 if the value v of sensor data from a sensor rises above a predefined alarm threshold a. The escalation threshold may be set to a value e. If the sensor data value v rises above a, the processing logic 64 will trigger the alarm. If the sensor data value v is at or below the value a-e, then the processing logic 72 will determine that no alarm should be triggered, and the escalation filter 102 will not escalate the data for further processing by another device. If the sensor data is in a range {a-e<v<a}, then the processing logic 64 will not trigger the alarm, but the escalation filter 102 will forward the data to another device for further processing.

The escalation threshold 108 is modified by security level modifiers 110. The security level modifiers 110 represent a value or values used to raise or lower the escalation threshold 108, depending on the current security level or state of the architecture 10 (or one or more zones 12 in the architecture 10). As the security level or state changes, the security level modifiers 110 modifies the escalation threshold 108 to make the evaluation logic 104 more or less prone to escalating the data. For example, if the security level is elevated, the evaluation logic 104 may be made more likely to escalate the data for further processing. If the security level is relatively low, the evaluation logic 104 may be made less likely to escalate the data.

In a further embodiment, the evaluation logic 104 applies pattern recognition and escalates the data if a particular pattern is identified in the data, regardless of whether the processing logic 64 decided to take an action in response to the data.

The evaluation logic 104 of the escalation filter 102 selects a device to which the data should be forwarded in a manner similar to the way that the evaluation logic 92 of the processing determination filter 90 selects a device to which the data should be forwarded. The criteria for the evaluation logic 104 may also be different than the criteria for the evaluation logic 92.

The escalation filter 102 is applied following processing of the data by the processing logic 64. An example of processing logic 64 is shown in FIG. 9.

The processing logic 64 includes evaluation logic 112. The evaluation logic 112 accepts input data, such as data from a detector 40 of a sensor 14, or aggregated data from multiple sensors, and processes the data to transform the data into new output data, modify existing data, or perform an action. The processed data is compared to a threshold 116, such as a triggering threshold 118. The triggering threshold 118 defines a value that, if the value of the input data rises above or falls below, causes an action to be performed. The evaluation logic 112 also applies pattern matching to the data to determine whether to take the action.

If the evaluation logic 112 indicates that the data exceeds the threshold, or that the data matches a predetermined pattern, the evaluation logic 112 may determine that an event is currently in progress or that an event is about to occur. In this case, the evaluation logic 112 may generate an event notification to be forwarded to the gateway entity.

The input data and/or processed data is also compared to a triggering ruleset 114. The triggering ruleset 114 defines rules 60 in which the conditions 82 relate to the data being processed. For example, one rule of the triggering ruleset 114 may indicate that, if the data includes a pattern indicative of a person returning home, an output device 18 such as a light should be turned on. Another rule of the triggering ruleset 114 may relate to sending a status update or notification to another device, such as a user's mobile device, the cloud processing device 28, or the third-party service 30.

The rules of the triggering ruleset 114 can be location-dependent (e.g., by including location information as one of the conditions 82). For example, if the rule is a rule that is triggered by a fire alarm and triggers an action 88 of turning on a sprinkler system, one of the conditions of the rule may be that the sprinklers should not be triggered until absolutely necessary if the output device (sprinkler) is in a computer lab or server room.

Figure 10A:
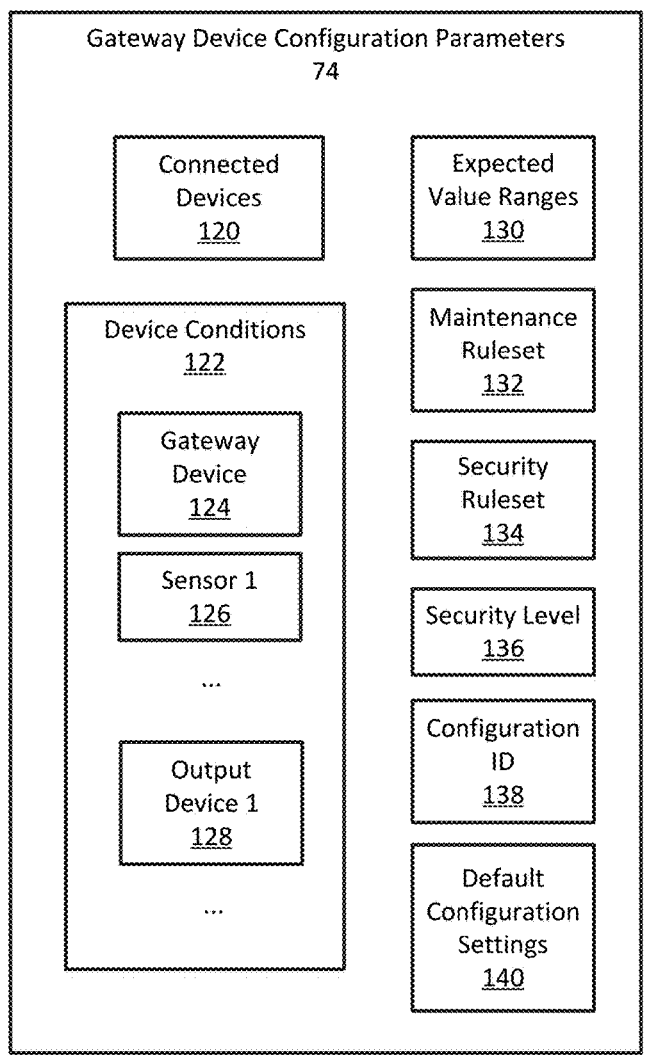
Figure 10B:
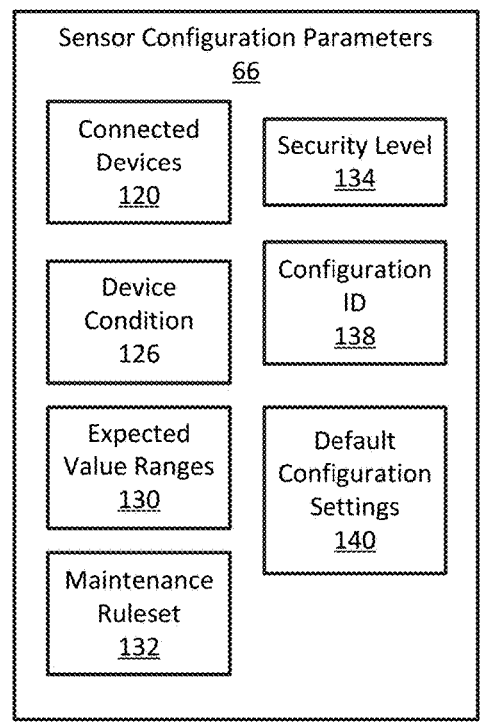

Turning now to the configuration parameters 66, 74, exemplary parameters for gateway entity 20 and the sensor 14 are depicted in FIGS. 10A and 10B, respectively.

FIG. 10A depicts configuration parameters 74 for deployment on a gateway entity 20. The configuration parameters 74 specify a list of connected devices 120. The list of connected devices 120 includes an identifier for the devices that are (or should be) communicatively coupled to the gateway entity 20, as well an indication of the type of device. The identifier may be an address of the device (e.g., an IPv6 address). The list of connected devices 120 includes devices that the gateway entity 20 is responsible for overseeing (e.g., the sensors 14, 16 and output device 18 of the monitored zone 12), as well as other devices with which the gateway entity 20 is capable of communicating (e.g., the cloud processing device 28 and the third-party service 30).

The configuration parameters 74 includes a list of device conditions 122 representing the status of the devices in the list of connected devices 120. The status of the devices reflects any, or a combination, of communication status (e.g., communicatively connected to the gateway entity 20 and/or the network 22), device maintenance status (e.g., a battery level of the device, whether the device is scheduled for maintenance, whether the device is reporting abnormal data, etc.), a configuration status of devices (e.g., a list of the configuration ID(s) 138 for the devices) and other statuses.

The list of device conditions 122 includes the condition of the gateway entity 124 itself, as well as a condition 126 for the sensors and a condition 126 for the output devices overseen by the gateway entity 20. The status conditions may be reported by the devices in response to a query from the gateway entity 20, at regular intervals, or may be updated by the gateway entity 20 (e.g., in response to not receiving a reply or an expected update from the device).

The configuration parameters 74 include expected value ranges 130 for the configured device. The expected value ranges represent a range of values for one or more operational parameters or characteristics of the configured device which indicate normal operation of the device. If the device generates an operational parameter or exhibits a characteristic outside of the expected value ranges 130, this may indicate a malfunction of the configured device requiring maintenance. The configuration parameters may, accordingly, include a maintenance ruleset with a set of rules 60 to be applied when one or more operational parameters or characteristics falls outside of the expected value ranges 130. The maintenance ruleset 132 may specify actions, such as performing diagnostic tests, reporting a malfunction to the third-party service 30 or the user, or performing maintenance operations (such as rebooting the device, using alternative hardware or software if available, or restoring the device to a last-known-good configuration).

The configuration parameters 74 also include a security ruleset 134 including rules 60 that specify actions 88 to be taken in the event that an alarm condition is raised or the security level 136 of the architecture 10 changes.

The security level 136 represents a level of vigilance or a monitoring state of the architecture 10 or a portion of the architecture 10. The security level 136 may be specified as a quantitative value (e.g., level 1, level 2, etc.), or may be specified as a set of "modes." Examples of "modes" are shown in Table 1 below:

TABLE 1

| Mode Name | Mode Description |
| --- | --- |
| Secure | Monitored zone(s) is/are secured. Sensors are enabled and working properly. No occupants are present in the monitored zone(s), except possibly pets. |
| Watchful | Monitored zone(s) is/are fairly to quite secure. Occupants may be at present. |
| At Risk | Transitional State indicating that monitored zone(s) is/are not secure. May be attempting to authenticate an occupant. |
| Intruders | Something is wrong in monitored zone(s). Could indicate the presence of intruders or vandalism. |
| Emergency | Life threatening condition detected, such as a fire or gas leak. |
| Trouble | A significant issue has been detected, such as a flood, power failure, or inoperable appliance. |
| Nuisance | A minor issue has been detected. |

The security ruleset 134 includes default actions to be taken whenever the security level 136 is in a particular status. For example, if the security level 136 is set to the "emergency" mode, the security ruleset 134 may cause requests for data to be repeatedly sent to a relevant sensor.

The configuration parameters 74 deployed on the device may be customized to the device, to the location in which the device is deployed, and/or based on other considerations. In order to identify which configuration is present on which device (which may be used, for example, to determine whether a particular device is well-suited to processing certain kinds of data), the configuration parameters 74 may be associated with one or more configuration ID(s) 138. The configuration ID(s) 138 may be, for example, a checksum, and identification string, or a series of flags uniquely identifying a part or all of a set of configuration parameters 74.

The configuration parameters 74 also include default configuration settings 140. The default configuration settings 140 are settings for some or all of the configuration parameters 74 that are applied in certain conditions, such as when the device is started or restarted, or when a configuration parameter 74 is corrupted or otherwise rendered unusable. As configuration updates 78 are received, the default configuration settings 140 may optionally be updated with the new configuration settings contained in the update 78.

As shown in FIG. 10B, the configuration parameters 66 for deployment on a sensor 14 are similar to the gateway entity configuration parameters 74. Because the sensor 14 is not typically responsible for overseeing other devices in the architecture 10, some of the elements from the gateway entity configuration parameters 74 may be eliminated in the sensor configuration parameters 66.

The rules 60, filters 62, processing logic 64, and configuration parameters 66, 74 are applied by devices in the architecture to process input data from one or more sensors 14. Methods performed by the devices in the architecture 10 will next be described with reference to FIGS. 11-15.

Figure 11:
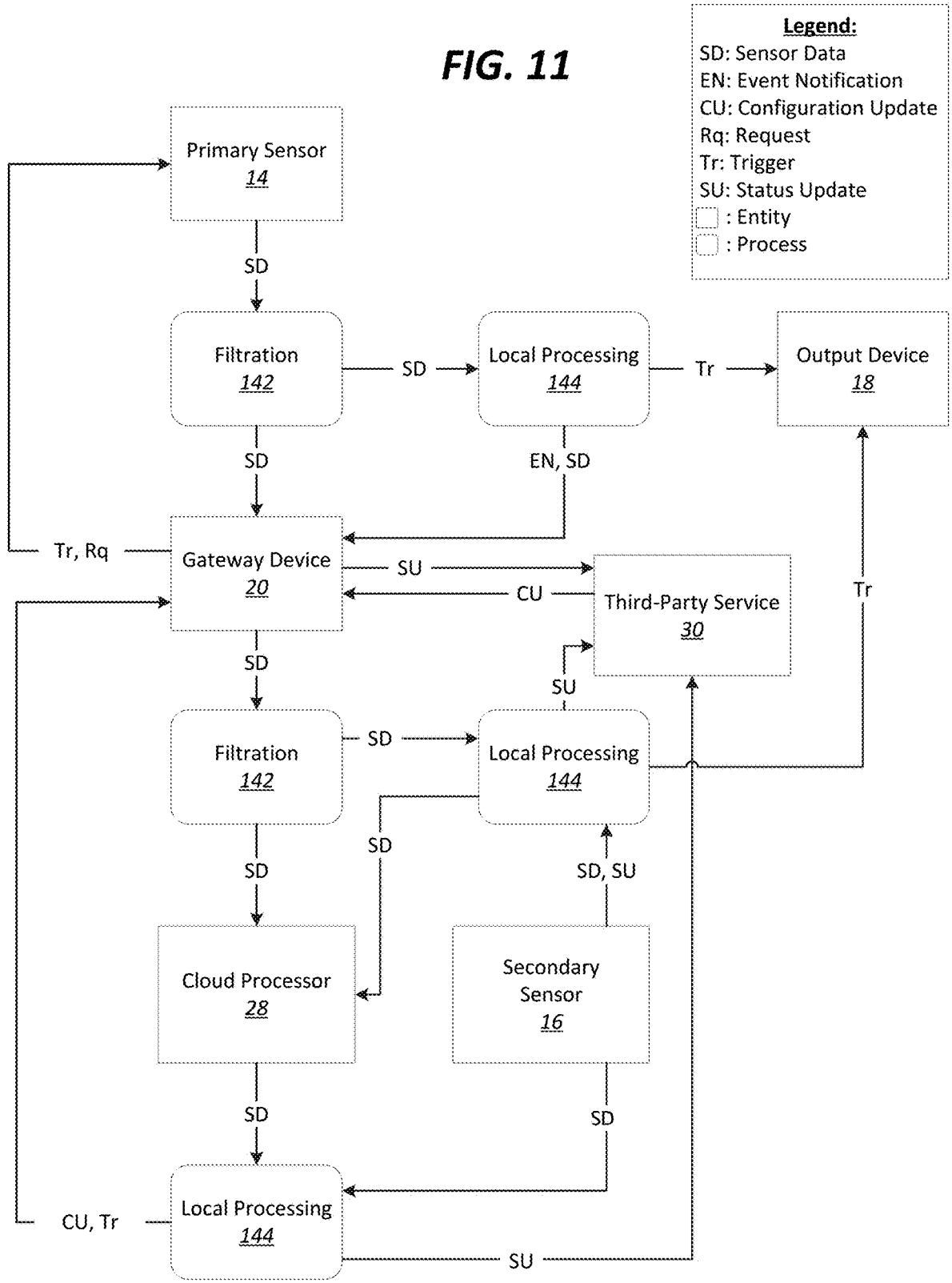
FIG. 11 is a data flow diagram illustrating exemplary data flows through the system architecture in accordance with the present disclosure.

FIG. 11 is a data flow diagram showing a flow of data through the architecture 10. For clarity of discussion, FIG. 11 focuses primarily on the above-described data processing and configuration updating aspects of the double balancing process 76. Some of the other processes described above are omitted from the data flow diagram for clarity.

Initially, the primary sensor 14 generates sensor data and performs a filtration step 142 to determine whether to process the sensor data locally (at the primary sensor 14) or forward the sensor data to the gateway entity 20. In the filtering process, input data from the sensor's data buffer 54 is retrieved by the processor 42. The data may optionally be aggregated with other data. The processor 42 then applies the processing determination filter 90 to the data.

Based on the logic and thresholds of the processing determination filter 90, the processor 42 determines whether the filter(s) indicate that the data should be logged locally. If so, the data is stored in the memory of the local device. The data may be stored for a predetermined amount of time, or until the data is deleted. Alternatively or in addition, the filter(s) may indicate that the data should be logged, but at a remote device. Accordingly, the data may be forwarded to the remote device for logging.

After the data is either logged, or a determination is made that the data does not need to be logged, the processor 42 determines if the filter(s) indicate that the data should be processed locally. If not, then the data is forwarded to the next destination indicated by the evaluation logic 92 (e.g., the gateway entity 20). If, on the other hand, the processor 42 determines that the data should be processed locally, then the processor loads the processing logic 64 and processes the data at the local processing step 144.

At the local processing step 144, there are several possible outcomes. One possible outcome is that the processed data does not trigger any actions. If the processed data does not trigger an action and an escalation filter 102 does not indicate that the data should be escalated for further processing, no action is taken and the data flow begins again using new data generated by the primary sensor 14. If the escalation filter 102 does indicate that the data should be escalated for further processing, then the sensor data is forwarded to the gateway entity 20.

Another possible outcome is that the local processing 144 does trigger a follow-up action, such as an event notification or an action performed by an output device. In these situations, the local processing step 144 generates an event notification and forwards it to the gateway entity 20, and/or generates a trigger and forwards it to a primary output device 18.

If the local processing 144 performed at the sensor 14 indicates that an event is occurring or is about to occur, the sensor 14 generates an event notification and forwards the event notification to the gateway entity 20. The event notification may be sent prior to unprocessed or processed data from the sensor 14. Upon receiving the event notification, the balancer 68 of the gateway entity 20 allocates resources (e.g., processing resources or memory resources) to the sensor 14 and prepares to receive data from the sensor 14 (e.g., by creating or updating one or more critical timing paths 24 to the sensor 14). The sensor 14 then forwards sensor data directly to the gateway entity 20 for evaluation.

Accordingly, the sensor 14 can be programmed with relatively simple processing logic 64 that identifies when events are occurring or about to occur, but does not necessarily have the complexity to fully process the data during an event. The more complex processing logic 64 is deployed at the gateway entity 20, which processes the data when the sensor 14 makes the initial determination that the data suggests the occurrence of an event.

If the local processing step 144 causes a status update to be sent to the gateway entity 20, the gateway entity 20 processes the change in status (e.g., by changing the security level 136 and applying any applicable rules from the security ruleset 134). This may involve triggering one or more output devices 18.

If the filtration step 142 or the local processing step 144 performed by the primary sensor 14 cause sensor data to be sent to the gateway entity 20 for further processing, the gateway entity 20 may optionally apply a filtration step 142 to determine whether the gateway entity 20 should process the sensor data locally (or through a secondary sensor that is reachable by the gateway entity 20). If so, the gateway entity performs a local processing step 144 on the sensor data by applying the gateway entity's processing logic 64 to the data.

At the local processing step 144 performed by the gateway entity 20, there are several possible outcomes. One possible outcome is that the processed data does not trigger any actions. If the processed data does not trigger an action and an escalation filter 102 does not indicate that the data should be escalated for further processing, no action is taken and the data flow may begin again using new data generated by the primary sensor 14. If the escalation filter 102 does indicate that the data should be escalated for further processing, then the sensor data is forwarded to the cloud processing device 28.

Another possible outcome is that the local processing 144 does trigger a follow-up action, such as a status change or an action performed by an output device. In these situations, the local processing step 144 generates a status update and forwards it to the third-party service 30, changes the security level 136 at the gateway entity 20 (if necessary), and triggers any applicable rules from the security ruleset 134. For example, the local processing step generates a trigger and forward it to a primary output device 18.

Yet another possible outcome is that the gateway entity 20 determines, either initially or as the data is processed, that the data should be forwarded to a secondary sensor 16 that is well-suited to processing the sensor data. For example, the secondary sensor 16 may be deployed with a specialized configuration 58 that is particularly well suited to processing the type of data received from the sensor 14. Accordingly, the local processing step 144 of the gateway entity 20 may forward the sensor data to the secondary sensor 16 for processing, and may receive a status update in response.

Alternatively or in addition, the local processing step 144 may determine that supplemental data is needed in order to process the sensor data. If the secondary sensor 16 has already stored data in the sensor data buffer 70 of the gateway entity 20, the gateway entity retrieves the secondary sensor data from its memory 52. Alternatively, the local processing step 144 may send a request to the secondary sensor 16, and receive sensor data from the secondary sensor 16 in response.

The filtration step 142 and/or the local processing step 144 performed by the gateway entity 20 may cause sensor data to be forwarded to the cloud-processor 28 for further processing. The cloud processor 28 applies a local filtration step 142 (not shown) and a processing step 144 to the data. Similar to the local processing step 144 performed by the gateway entity 20, the cloud-processor 28 may determine that additional data is needed from a secondary sensor 16.

If the local processing step 144 performed by the cloud- or third-party processor 30 generates a status update and/or any triggers for output device 18, the status update and trigger(s) are sent to the gateway entity 20 and/or the third-party service 30 to be acted upon accordingly.

Configuration updates may also be sent to the gateway entity 20 as an output of the local processing step 144 performed by the cloud processing device 28. The configuration updates may change configuration settings of the gateway entity 20.

It is noted that, although FIG. 11 shows the sensor 14 forwarding data to the gateway entity 20 for analysis, the sensor 14 may also forward data directly to the cloud- or third-party processing device 30.

Figure 12:
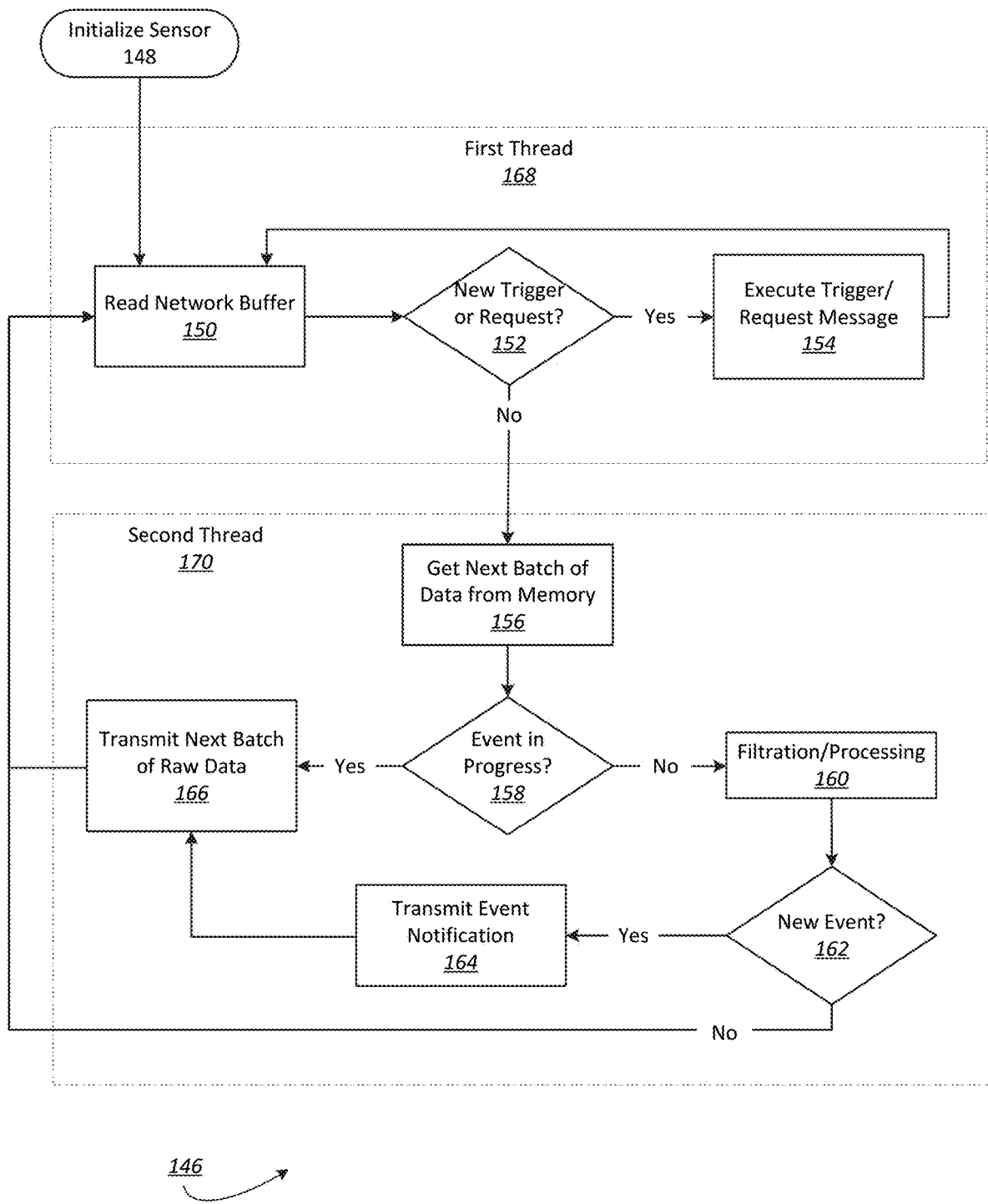
FIG. 12 is a flowchart depicting an exemplary method performed by a sensor device in accordance with the present disclosure.

FIG. 12 depicts an exemplary operating procedure 146 suitable for use by the sensor 14 (and any other sensors in the architecture 10). The procedure begins at step 148, where the sensor is initialized. This may involve, for example, performing system startup checks, loading the default configuration settings 140 from memory, setting any relevant parameters in the configuration 58 based on the default configuration settings 140, initializing the buffers 54, 56, establishing communication with the gateway entity 20 through the communication interface 46, and applying relevant maintenance rules from the maintenance ruleset 132.

Processing then proceeds to step 150, where the sensor 14 checks the network buffer 56 for new messages. If the sensor 14 determines, at step 152, that the network buffer 56 includes a new trigger or remote access request (e.g., from the gateway entity 20), then processing proceeds to step 154 and the trigger or request message is processed. In the case of a trigger, the sensor 14 may parse the trigger message to retrieve an action that the sensor 14 is requested to take, such as triggering an output device 18 accessible to the sensor 14.

In the case of a remote access request, the sensor 14 parses the request to identify an entity that is requesting access to the sensor's capabilities. The sensor 14 evaluates or authenticates the entity to determine if the entity is authorized to access the requested capabilities. If so, the sensor opens or connects to a communication channel with the requesting entity, and executes authorized commands from the requesting entity that allow the requesting entity to control the sensor capabilities that were the subject of the request. For example, the third-party service 30 may submit a remote access request to a video camera, and may submit commands to control the video camera's positioning abilities (e.g., pan, tilt, and rotate). Alternatively, the third-party service 30 might request access to audio and/or video data from the camera, and could be provided with access to the camera's data buffer 54.

Processing then returns to step 150, where the network buffer 56 is checked for additional triggers or remote access requests.

If the determination at step 152 is "NO" (i.e., no new triggers or remote access requests are present in the network buffer 56), processing proceeds to step 156 and the next batch of data is retrieved from the data buffer 54.

Processing then proceeds to step 158, where the sensor 14 determines if an event is already in progress. For example, if previous processing performed by the sensor caused the sensor to send an event notification to the gateway entity 20, then the sensor 14 may set an "event in progress" flag at a designated location in the sensor's memory 52. When the sensor 14 or the gateway entity 20 determines that the event is over, the sensor 14 may reset the "event in progress" flag. At step 158, the sensor 14 may check the event in progress flag to evaluate whether an event is currently in progress.

If the outcome at step 158 is "YES" (i.e., an event is currently in progress), then the sensor 14 proceeds directly to step 166 and forward sensor data from the data buffer 54 directly to the gateway entity for processing.

If the outcome at step 158 is "NO" (i.e., an event is not currently in progress), then the sensor 14 proceeds to step 160 and performs filtration and/or processing (e.g., corresponding to steps 142 and 144 from FIG. 11) on the data. Based on the filtration and/or processing, the sensor evaluates, at step 162, whether the newly processed data indicates that an event is currently occurring or is predicted to occur. If not, then processing returns to step 150 and the network buffer is again checked for new messages.

If the determination at step 162 is "YES" (i.e., an event is occurring or predicted to occur), then processing proceeds to step 164 and the sensor 14 transmits an event notification to the gateway entity 20 to inform the gateway entity 20 that sensor data will be arriving at the gateway entity in the near future. In response, the gateway entity allocates resources in preparation for receiving the data. Processing then proceeds to step 166, where the next batch of raw data is transmitted to the gateway entity 20.

Some or all of the steps of the operating procedure 146 may be performed in parallel, if the processor 42 of the sensor 14 supports parallel processing. For example, FIG. 12 separates the steps used to process triggers and remote access requests from the steps used to process the sensor data. The triggers/remote access requests are processed in a first thread 168, and the sensor data processing steps are performed in a second thread 170. If steps of the operating procedure 146 are to be performed in parallel, then the initialization step 148 may include creating new threads for parallel sets of procedures.

Figure 13:
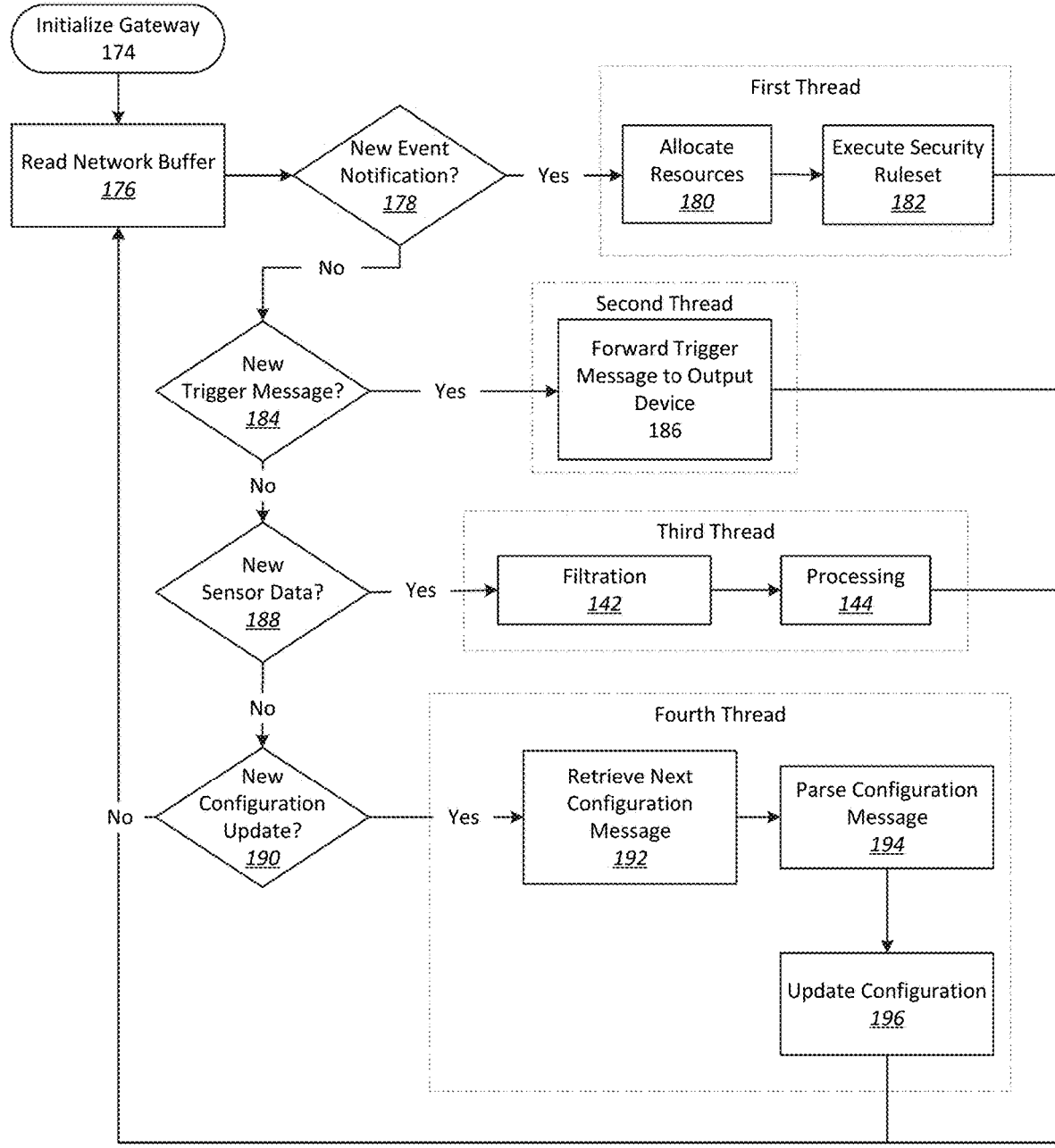
FIG. 13 is a flowchart depicting an exemplary method performed by a gateway entity in accordance with the present disclosure.

FIG. 13 depicts a corresponding operating procedure 172 suitable for performance by a gateway entity 20. The procedure 172 begins at step 174, when the gateway entity 20 is initialized. This may involve, for example, performing system startup checks, loading the default configuration settings 140 from memory, setting any relevant parameters in the configuration 58 based on the default configuration settings 140, initializing the data buffers 54, 56, establishing communication with devices in the list of connected devices 120, and applying relevant maintenance rules from the maintenance ruleset 132.

Processing then proceeds to step 176, where the network buffer 56 is checked to determine if there are any pending messages for evaluation. Because the gateway entity 20 handles many different types of messages, the messages are be classified at steps 178, 184, 188, and 190. The different types of messages are handled in order of priority (e.g., messages having event notifications, which could include an alarm condition, may be processed before messages having new sensor data for processing).

At step 178, the gateway entity 20 determines if there is an event notification pending. If so, processing proceeds to step 180 and the event notification is processed. At step 180, the balancer 68 of the gateway entity allocates resources for the sensor 14 that submitted the event notification. The amount of resources allocated may depend on the type of sensor that submitted the event notification or the type of event. For example, processing data from a smoke detector may involve relatively simple checks, such as whether the detector 40 reads a value above a threshold that indicates the presence of smoke in the room and/or checking a nearby thermometer. On the other hand, processing data from a glass break sensor may involve complex audio processing steps, and therefore the balancer 68 may allocate more resources in response to an event notification from a glass break sensor than for one from a smoke detector.

Processing then proceeds to step 182, and the security ruleset 134 is evaluated/executed. If the security level 136 is changed by the security ruleset, the gateway entity 20 may update the security level 136. Once the event notification is addressed, processing then returns to step 176 and the network buffer 56 is checked for additional messages.

At step 184, the gateway entity 20 determines if there is a new trigger message pending. If so, processing proceeds to step 186 and the gateway entity forwards the trigger message to affected output devices 18. Processing then returns to step 176 and the network buffer 56 is checked for additional messages.

At step 188, the gateway entity 20 determines if there is new sensor data to be processed. If so, processing proceeds to steps 142 and 144 and the gateway entity's filtration and processing methods are performed. If multiple batches of data are pending to be processed, the gateway entity 20 may prioritize data for which an event notification has been received, and may prioritize high-priority events over low priority events. After the sensor data is processed, processing returns to step 176 and the network buffer 56 is checked for additional messages.

At step 190, the gateway entity 20 determines if there are any configuration messages pending. If so, processing proceeds to step 192 and the next configuration update 78 is retrieved from the network buffer 56. At step 194, the retrieved configuration update 78 is parsed to separate the respective elements (e.g., the rules 60, filters 62, processing logic 64, and configuration parameters 66) of the configuration update 78. For example, if the elements are separated by a designated character, the gateway entity reads the configuration update 78 until the designated character is reached, and identifies the read data with the appropriate element of the configuration update 78. Alternatively, the header 80 may specify where to find the respective elements of the configuration update 78.

At step 196, the respective elements are evaluated to determine how to update the gateway entity's configuration 74. For example, the gateway entity 20 determines if the element of the configuration update 78 is a new configuration element, or is a new version of an existing configuration element already deployed on the gateway entity 20. If no corresponding configuration element exists (e.g., the configuration element is a new rule to be added to the triggering ruleset 114), then the configuration element is added to the configuration 74. If a corresponding configuration element does exist (e.g., the configuration element is a new version of an existing rule in the triggering ruleset 114), then the new configuration element overwrites the old configuration element.

Processing then returns to step 176 and the network buffer 56 is checked for additional messages.

Some or all of the steps of the operating procedure 172 may be performed in parallel. FIG. 13 depicts an exemplary embodiment in which the status updates are processed in a first thread, trigger messages are processed in a second thread, sensor data is processed in a third thread, and status updates are processed in a fourth thread. If steps of the operating procedure 172 are to be performed in parallel, then the initialization step 174 may include creating new threads for parallel sets of procedures.

The exemplary procedures described in FIGS. 11-13 may form part of the double balancing process 76. These procedures may be supplemented with additional procedures as needed or applicable.

Figure 14A:
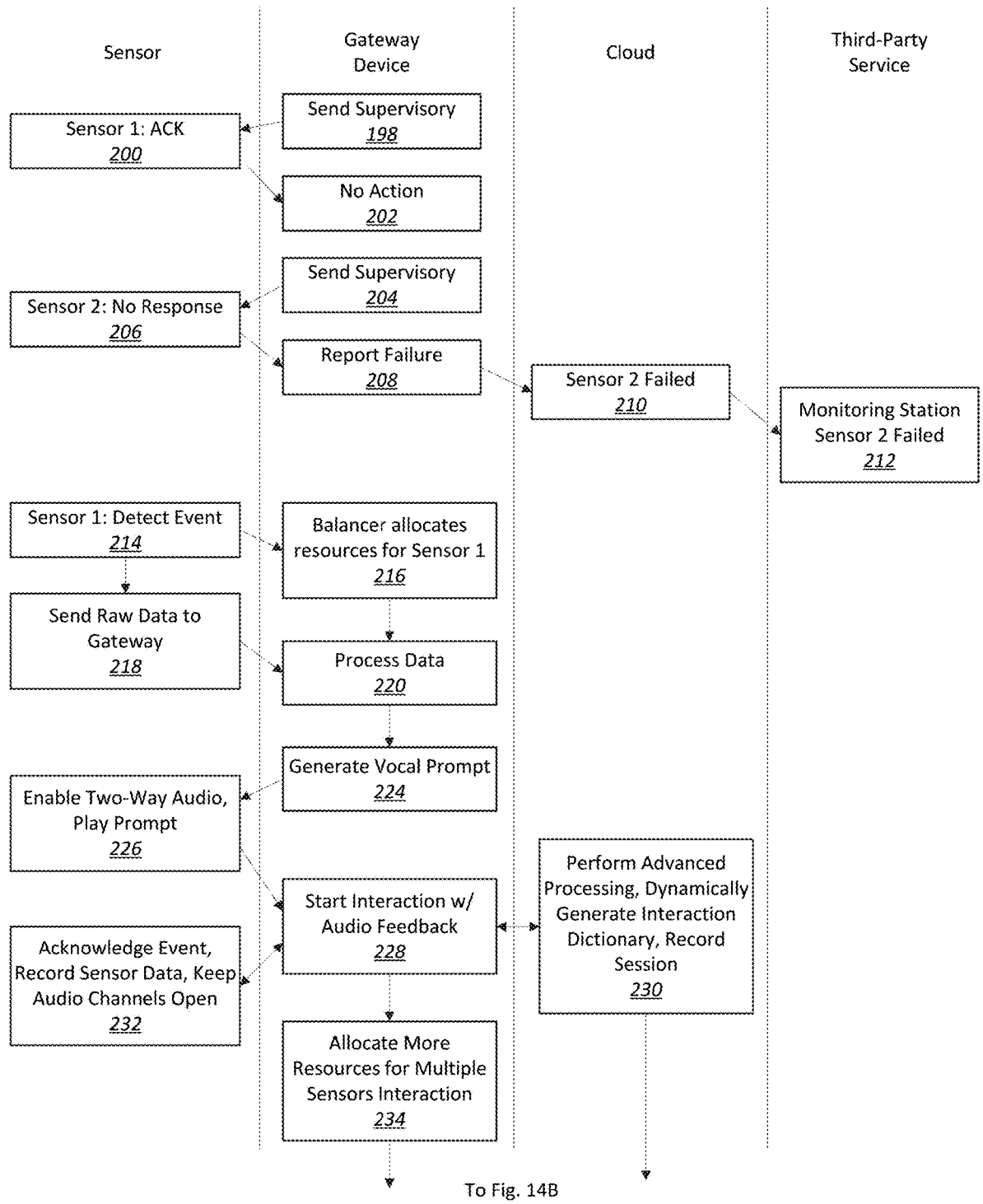
FIGS. 14A-14B are exemplary processing flow graphs depicting processing steps performed in an exemplary voice interactive service in accordance with the present disclosure.
Figure 14B:
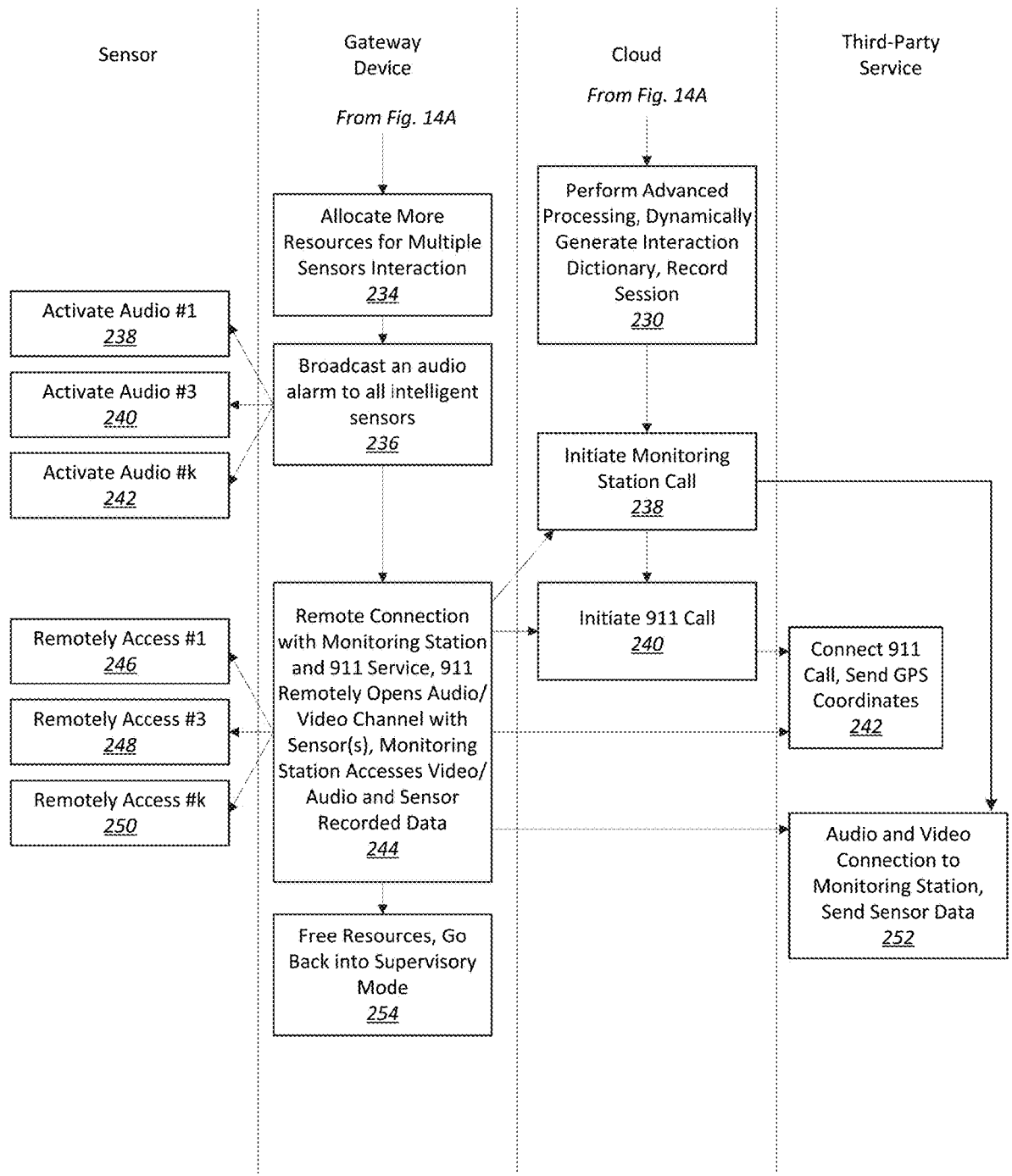

FIGS. 14A-14B depict an example of the double balancing process 76 at work.

At step 198, the gateway entity 20 sends a supervisory message to a first sensor 14, requesting that the sensor confirm that it is operational and connected to the gateway entity 20. At step 200, the sensor responds by acknowledging the supervisory message, and the gateway entity therefore takes no action (step 202) in response to the acknowledgement.

Conversely, when the gateway entity 20 sends a supervisory message, at step 204, to a second sensor 16, the gateway entity receives no response (step 206). Accordingly, a step 208, the gateway entity notes that the second sensor 16 has failed, and reports the failure to the cloud processing device 28. The cloud processing device 28 notes, at step 210, that the second sensor has failed, and reports the failure to the third-party service 30. At step 212, the third-party service 30 notes that the second sensor 16 has failed.

At step 214, the first sensor 14 detects the occurrence of an event, and sends an event notification to the gateway entity 20. In response to the event notification, at step 216 the gateway entity 20 calls upon the balancer 68 to allocate resources for the first sensor 14.

At step 218, the first sensor 14 sends raw data to the gateway entity 20, which the gateway entity 20 processes at step 220. In this example, the gateway entity 20 determines, at step 220, that the data triggers an action from the triggering ruleset 114. In this case, the action involves generating a vocal prompt back at the first sensor 14 in order to solicit further information. Accordingly, at step 224, the gateway entity 20 generates a vocal prompt (e.g., "An event has been detected by the first sensor. Do you require assistance?"). The vocal prompt may be a predetermined prompt stored in the triggering ruleset 114, or may be dynamically generated by the gateway entity 20. For example, the gateway entity 20 may generate a text file containing information to be conveyed to the first sensor 14, and may use text-to-speech algorithms to convert the text file into an audio stream.

At step 226, the gateway sends a remote access request to the first sensor 14, requesting that the first sensor 14 yield control of the sensor's speaker and microphone. In response, the sensor 14 opens a channel with the gateway entity 20 to allow two-way audio communication to take place, and plays the prompt generated at step 224 through the sensor's speaker.

At step 228, the gateway entity 20 receives an acknowledgement that the sensor 14 has accepted the remote access requests, and begins two-way interaction with any users in the presence of the sensor 14, using audio feedback and speech-to-text algorithms. The gateway entity 20 forwards the audio data received from the sensor 14 to the cloud-processing device 28 at step 230, which in turn performs advanced processing of the data, records and logs the audio for future reference, and eases the processing requirements on the gateway entity 20 by dynamically generating an interaction dictionary based on the content of the received audio. For example, the cloud-processing device 28 provides the gateway entity 20 with a list of words or phrases that are applicable in the context of the received audio, and the gateway entity uses the list of words and phrases to carry on a real-time conversation through the first sensor 14.

For instance, in response to the gateway entity's initial message ("do you require assistance?") a user may have responded with "yes, there is a fire in the house". In response, the cloud processing device 28 generates an interaction dictionary that includes phrases such as "how many people are in the house?", "can everyone safely exit the house?", and "where is the person requiring assistance currently located?" If the gateway entity 20 learns that someone cannot safely exit the house, the gateway entity 20 can then, using the interaction dictionary, generate a prompt asking where anyone requiring assistance is located.

At step 232, the sensor 14 receives an audio input acknowledging the event (e.g., "yes, there is a fire in the house"). The sensor 14 maintains the audio channel opened at step 226 and continues to forward audio data to the gateway entity 20.

At step 234, having received an acknowledgement that the event is taking place, the gateway entity 20 determines that it should contact other sensors in the vicinity of the first sensor 14. Accordingly, the balancer 68 of the gateway entity 20 allocates additional resources for the multiple sensors.

At step 236, the gateway entity 20 broadcasts an audio alarm (e.g., "an emergency has been detected; please calmly proceed to the nearest exit") to all of the sensors in the vicinity of the first sensor 14. For example, the audio alarm may be in the form of a trigger message containing an audio recording and instructions to play the audio recording through sensor speakers. At steps 238-242, the sensors in the vicinity of the first sensor 14 (except for the second sensor 16, which exhibited a failure in steps 206-212) receives the audio alarm and plays the audio alarm through its respective speaker.

Meanwhile, at step 238, the cloud processing device 28 initiates a call to a monitoring station of the third-party service 30. In addition, at step 240, the cloud processing device 28 initiates a 911 call to summon first responders. The cloud processing device 28 hands off the 911 call to the third-party service 30, which connects the call at step 242 and transmits GPS coordinates (e.g., from the gateway entity 20 and/or the first sensor 14) to the 911 service.

Simultaneously, at step 244 the gateway entity 20 remotely connects to the third-party service 30 and the 911 service, and submits a remote access request to accessible sensors (steps 246-250). The gateway entity 20 accesses the sensor data and provides it to the third-party service 30 and the 911 service. At step 252, the third-party service 30 receives the sensor data and maintains an audio and video connection to the monitored zone 12 through the remotely-accessed sensors.

After it is determined that the event is concluded, the gateway entity 20 (at step 254) calls upon the balancer 68 to free the resources allocated to the event, and returns to a supervisory mode.

As can be seen from this example and the above described embodiments, the double balancing process 76 allows processing jobs in the architecture 10 to be distributed among the different levels of the hierarchy 32 as appropriate, saving processing resources at the sensors 14, 16 and the gateway entity 20. Because the sensors only need to process basic information to determine if an event is occurring, and then can forward the data to the gateway entity 20, the sensors can operate with fewer processing resources (thus making them less expensive and better able to operate in low-power or idle modes). Moreover, complex processing tasks may be performed at higher levels of the hierarchy 32, allowing more complicated data analysis and procedures (such as real-time audio interactions) to be performed.

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A gateway entity comprising:
   a memory configured to store data from a sensor having sensor processing or memory resources; and
   a processor configured to:
      receive a resource allocation request from the sensor indicative of the sensor having pre-determined via at least partial processing of the data that an event requiring additional processing consideration has occurred or is predicted to occur and further indicative of the data being designated for processing by another device;
      allocate, in response to the resource allocation request, additional gateway entity processing or memory resources beyond the sensor processing or memory resources to process the data from the sensor;
      receive the data forwarded by the sensor responsive to the sensor being unable to determine whether the data rises to a level of an alarm condition;
      process the data using the additional gateway entity processing or memory resources to determine whether the data should have triggered the alarm condition;
      determine, in response to the sensor being unable to determine whether the data rises to the level of the alarm condition and further in response to the gateway entity determining that the data should have triggered the alarm condition, whether one or more configuration settings of the sensor need to be changed to cause the sensor to better change a specific threshold or algorithm;
      push updated configuration settings to the sensor in response to determining that the one or more configuration settings of the sensor need to be changed to cause the sensor to change the specific threshold or algorithm; and
      free the additional gateway entity processing or memory resources when the event is concluded.

2. The gateway entity of claim 1, wherein the memory further stores processing logic specific to a type of data generated by the sensor, wherein the processor is further configured to:
   receive a configuration update determined by an upper level entity, to change the processing logic used by the gateway entity to process the data received from the sensor; and
   process the configuration update to change the processing logic.

3. The gateway entity of claim 1, wherein the processor is further configured to transmit a remote access request to the sensor, the remote access request instructing the sensor to yield control over one or more components of the sensor to the gateway entity.

4. The gateway entity of claim 1, wherein the data includes audio data, and the processor is further configured to:
   generate a real-time audio interaction using an interaction dictionary provided by a cloud processing device.

5. The gateway entity of claim 1, wherein the processor is further configured to generate a trigger in response to the data, the trigger instructing an output device to take an action.

6. The gateway entity of claim 1, wherein allocating the additional gateway entity processing or memory resources is performed based on a type of the sensor or a type of the data provided by the sensor.

7. A method comprising:
   receiving, at a processor of a gateway entity, a resource allocation request from a sensor indicative of the sensor having pre-determined via processing of data that an event requiring additional processing consideration is occurring or is predicted to occur at the sensor and further indicative of the data being designated for processing by another device, the sensor having sensor processing or memory resources;
   allocating, in response to the resource allocation request, additional gateway entity processing or memory resources beyond the sensor processing or memory resources to process the data from the sensor;
   receiving, by the gateway entity, the data forwarded by the sensor responsive to the sensor being unable to determine whether the data rises to a level of an alarm condition;
   processing the data using the additional gateway entity processing or memory resources to determine whether the data should have triggered the alarm condition;
   determining, in response to the sensor being unable to determine whether the data rises to the level of the alarm condition and further in response to the gateway entity determining that the data should have triggered the alarm condition, whether one or more configuration settings of the sensor need to be changed to cause the sensor to change a specific threshold or algorithm; and
   pushing updated configuration settings to the sensor in response to determining that the one or more configuration settings of the sensor need to be changed to cause the sensor to change the specific threshold or algorithm.

8. The method of claim 7, further comprising triggering an action in response to the processing of the data.

9. The method of claim 8, wherein triggering the action comprises at least one of forwarding the data to a cloud processing device for advanced processing or triggering an output device to activate an alarm.

10. The method of claim 8, wherein triggering the action comprises providing the data from the sensor to a first-responder service.

11. The method of claim 8, wherein triggering the action comprises engaging in a two-way audio interaction with the sensor.

12. The method of claim 11, wherein the two-way audio interaction is conducted based on an interaction dictionary provided by a cloud processing device.

13. The method of claim 7, further comprising:
    determining that the event is completed; and
    freeing the additional gateway entity processing or memory resources.

14. The method of claim 7, further comprising:
    determining, in response to the data from the sensor, to interact with additional sensors; and
    allocating additional resources of the gateway entity for interaction with multiple sensors.

15. A gateway entity providable between a sensor network and a cloud processing device, comprising:

a memory configured to store data from a sensor of the sensor network, the sensor having sensor processing or memory resources; and a processor configured to:
receive a resource allocation request from the sensor indicative of the sensor having pre-determined via at least partial processing of the data that an event has occurred or is predicted to occur, which requires real-time or near-real time processing by a device other than the sensor, the resource allocation request further indicative of the sensor being unable to fully process the data;

allocate, in response to the resource allocation request, additional gateway entity processing or memory resources beyond the sensor processing or memory resources of the sensor to process the data of the sensor;

receive the data from the sensor;

process the data using the additional gateway entity processing or memory resources to decide whether to trigger an alarm;

send the data to the cloud processing device causing the cloud processing device to:
determine, responsive to the gateway entity deciding not to trigger the alarm but the cloud processing device determining that the alarm should have been triggered, or responsive to the gateway entity deciding to trigger the alarm but the cloud processing device determining that the alarm should not have been triggered, whether a processing configuration of the gateway entity needs to be changed to cause the gateway entity to change a specific threshold or algorithm; and push a configuration update to the gateway entity in response to determining that the processing configuration of the gateway entity needs to be changed to cause the gateway entity to change the specific threshold or algorithm;

receive the configuration update from the cloud processing device;

process the configuration update to change the processing configuration used by the gateway entity; and apply the changed processing configuration to analyze the data received from the sensor.

16. The gateway entity of claim 15, wherein the configuration update comprises lowering a detection threshold of the gateway entity responsive to the gateway entity deciding not to trigger the alarm but the cloud processing device determining that the alarm should have been triggered.

17. The gateway entity of claim 15, wherein the configuration update comprises raising a detection threshold of the gateway entity responsive to the gateway entity deciding to trigger the alarm but the cloud processing device determining that the alarm should not have been triggered.

18. The gateway entity of claim 15, wherein the processor is further configured to transmit a remote access request to the sensor, the remote access request instructing the sensor to yield control over one or more components of the sensor to the gateway entity.

19. The gateway entity of claim 15, wherein the processor is further configured to generate a trigger in response to the data, the trigger instructing an output device to take an action.

20. The gateway entity of claim 15, wherein allocating the additional gateway entity processing or memory resources is performed based on a type of the sensor or a type of the data provided by the sensor.

* * * * *